(12) United States Patent
Reid et al.

(10) Patent No.: US 12,229,599 B2
(45) Date of Patent: Feb. 18, 2025

(54) ALGORITHMICALLY OPTIMIZED DETERMINATION OF RESOURCE ASSIGNMENTS IN MACHINE REQUEST ANALYSES

(71) Applicant: Certinia Inc., Austin, TX (US)

(72) Inventors: Robin Andrew Cecil Reid, Bradford (GB); Geoffrey John Cawood, Harrogate (GB); Nicholas James Taylor, Harrogate (GB); Samantha Oxley, Harrogate (GB)

(73) Assignee: Certinia Inc., Austin, TX (US)

(*) Notice: Subject to any disclaimer, the term of this patent is extended or adjusted under 35 U.S.C. 154(b) by 378 days.

(21) Appl. No.: 17/707,767

(22) Filed: Mar. 29, 2022

(65) Prior Publication Data

US 2023/0315524 A1 Oct. 5, 2023

(51) Int. Cl.
G06F 9/50 (2006.01)
(52) U.S. Cl.
CPC .................. *G06F 9/5027* (2013.01)
(58) Field of Classification Search
None
See application file for complete search history.

(56) References Cited

U.S. PATENT DOCUMENTS

| | | | |
|---|---|---|---|
| 6,829,621 | B2 | 12/2004 | Keller |
| 8,316,296 | B2 | 11/2012 | Paek et al. |
| 8,667,495 | B1 * | 3/2014 | Brandwine ........... G06F 9/5061 |
| | | | 709/224 |
| 8,675,842 | B2 | 3/2014 | Franklin-Barr et al. |
| 9,262,218 | B2 | 2/2016 | Bostic et al. |
| 9,754,226 | B2 | 9/2017 | Zheng et al. |
| 10,169,035 | B1 | 1/2019 | Caspi |

(Continued)

FOREIGN PATENT DOCUMENTS

| | | | |
|---|---|---|---|
| WO | 2005022353 | A3 | 11/2005 |
| WO | 2019029721 | A1 | 2/2019 |

OTHER PUBLICATIONS

Zhang et al.; "Simulation-based optimization for dynamic resource allocation"; 2004 Elsevier B.V.; doi:10.1016/j.autcon.2003.12.005; (Zhang_2003.pdf; pp. 409-420) (Year: 2003).*

(Continued)

*Primary Examiner* — Hiren P Patel
(74) *Attorney, Agent, or Firm* — Carr & Ferrell LLP

(57) ABSTRACT

Techniques for algorithmically optimized determination of resource assignments in machine request analyses are described, including receiving a request having resource request data and criteria data, evaluating the request to identify a resource type and a suitability matrix, which are analyzed to generate a data model, to select an algorithm to apply to the data model, to evaluate an output from the algorithm being applied to the data model to generate a resultant dataset, including evaluating another resultant dataset generated by applying another algorithm to another data model generated using the request data, the criteria data, the resource type, and the suitability matrix, to generate an optimization cost for each solution indicating the resource to be assigned to the request, and to transmit a resultant dataset identifying the one or more resources based on the optimization cost.

19 Claims, 10 Drawing Sheets

(56) References Cited

U.S. PATENT DOCUMENTS

| | | | |
|---|---|---|---|
| 10,224,035 B1 | 3/2019 | Koenig et al. | |
| 10,276,185 B1 | 4/2019 | Ma et al. | |
| 10,304,014 B2* | 5/2019 | Garza | G06F 9/50 |
| 10,346,809 B1 | 7/2019 | Byrne | |
| 10,467,218 B2 | 11/2019 | Willcock et al. | |
| 10,509,683 B2* | 12/2019 | Furman | G06F 9/5061 |
| 10,616,402 B2 | 4/2020 | Byrne | |
| 10,635,748 B2 | 4/2020 | Liu et al. | |
| 10,636,013 B2 | 4/2020 | Byrne | |
| 10,880,429 B2 | 12/2020 | Byrne | |
| 10,901,787 B2* | 1/2021 | Kaul | G06F 9/5055 |
| 10,902,385 B2 | 1/2021 | Byrne | |
| 11,043,217 B2 | 6/2021 | Byrne | |
| 11,182,707 B2* | 11/2021 | Sahni | G06Q 10/063112 |
| 11,256,860 B2 | 2/2022 | Murashin | |
| 11,321,293 B2 | 5/2022 | Willcock et al. | |
| 11,687,370 B2* | 6/2023 | Nagar | G06F 9/5027 |
| | | | 718/104 |
| 11,693,702 B2* | 7/2023 | Rosanova | G06F 9/5061 |
| | | | 718/104 |
| 2002/0091707 A1 | 7/2002 | Keller | |
| 2004/0186763 A1 | 9/2004 | Smith | |
| 2005/0027577 A1* | 2/2005 | Saeed | G06Q 10/0631 |
| | | | 705/7.12 |
| 2005/0069103 A1 | 3/2005 | DiVenuta et al. | |
| 2005/0257148 A1 | 11/2005 | Goodman et al. | |
| 2006/0047550 A1* | 3/2006 | Dineen | G06Q 10/06311 |
| | | | 705/7.29 |
| 2007/0244673 A1* | 10/2007 | Khosla | G06Q 10/067 |
| | | | 703/2 |
| 2007/0250335 A1* | 10/2007 | Hodges | G06Q 10/0633 |
| | | | 705/7.27 |
| 2007/0276713 A1* | 11/2007 | Lee | G06Q 10/06315 |
| | | | 705/7.14 |
| 2008/0114683 A1 | 5/2008 | Neveu et al. | |
| 2009/0048896 A1* | 2/2009 | Anandan | G06Q 10/06 |
| | | | 705/7.26 |
| 2010/0088205 A1 | 4/2010 | Robertson | |
| 2011/0066490 A1* | 3/2011 | Bassin | G06F 11/3684 |
| | | | 705/348 |
| 2011/0276565 A1 | 11/2011 | Zheng et al. | |
| 2012/0198466 A1* | 8/2012 | Cherkasova | G06F 9/5066 |
| | | | 718/104 |
| 2013/0031137 A1 | 1/2013 | Chen et al. | |
| 2013/0090090 A1 | 4/2013 | Rivere | |
| 2014/0012502 A1 | 1/2014 | Joshi et al. | |
| 2014/0052489 A1* | 2/2014 | Prieto | G06Q 10/063 |
| | | | 705/7.23 |
| 2014/0114683 A1 | 4/2014 | Natanzon et al. | |
| 2014/0122143 A1 | 5/2014 | Fletcher et al. | |
| 2014/0156634 A1 | 6/2014 | Buchmann et al. | |
| 2014/0236884 A1 | 8/2014 | Clark et al. | |
| 2014/0344119 A1 | 11/2014 | Haines | |
| 2015/0032366 A1 | 1/2015 | Man et al. | |
| 2015/0094097 A1 | 4/2015 | Fraccaroli | |
| 2015/0161271 A1 | 6/2015 | Gur et al. | |
| 2015/0195344 A1 | 7/2015 | Surendran et al. | |
| 2016/0253463 A1* | 9/2016 | Shu | G16H 40/20 |
| | | | 705/2 |
| 2017/0048339 A1 | 2/2017 | Straub | |
| 2017/0161651 A1 | 6/2017 | Demarchi et al. | |
| 2017/0206454 A1 | 7/2017 | Jihn | |
| 2017/0268892 A1 | 9/2017 | Singh et al. | |
| 2017/0293610 A1 | 10/2017 | Tran | |
| 2018/0081921 A1 | 3/2018 | Willcock et al. | |
| 2019/0045050 A1 | 2/2019 | Gallagher et al. | |
| 2019/0197489 A1 | 6/2019 | Byrne | |
| 2019/0199852 A1 | 6/2019 | Byrne | |
| 2019/0205368 A1 | 7/2019 | Wang et al. | |
| 2019/0279162 A1 | 9/2019 | Byrne | |
| 2019/0392828 A1 | 12/2019 | Byrne | |
| 2020/0050996 A1 | 2/2020 | Generes, Jr. et al. | |
| 2020/0089745 A1 | 3/2020 | Murashin | |
| 2020/0160253 A1 | 5/2020 | Johnson et al. | |
| 2020/0195774 A1 | 6/2020 | Byrne | |
| 2020/0219064 A1 | 7/2020 | Byrne | |
| 2021/0142249 A1* | 5/2021 | Ellsworth | G06N 20/10 |
| 2021/0152688 A1 | 5/2021 | Byrne | |
| 2022/0188480 A1* | 6/2022 | Shimada | G06Q 10/0631 |

OTHER PUBLICATIONS

Pandit et al.; "Resource Allocation in Cloud using Simulated Annealing"; 2014 IEEE; (Pandit_2014.pdf; pp. 21-27) (Year: 2014).*

Byrne, Matthew, Notice of Allowance and Fee(s) Due mailed Feb. 19, 2021 for U.S. Appl. No. 16/240,457.

Cai et al., "Itinerary recommender system with semantic trajectory pattern mining from geo-tagged photos," Expert Systems With Applications, vol. 94, ISSN 0957-4174, pp. 2-40, URL: https://doi.org/10.1016/j.eswa.2017.10.049 (Year: 2018).

Corrielus, Jean M., Non-Final Office Action mailed Jan. 25, 2019 for U.S. Appl. No. 15/271,186.

Corrielus, Jean M., Non-Final Office Action mailed Sep. 28, 2021 for U.S. Appl. No. 16/601,125.

Corrielus, Jean M., Notice of Allowance and Fee(s) Due mailed Jan. 4, 2022 for U.S. Appl. No. 16/601,125.

Corrielus, Jean M., Notice of Allowance and Fee(s) Due mailed Jun. 12, 2019 for U.S. Appl. No. 15/271,186.

Dean Jr., Joseph E., Non-Final Office Action mailed Jun. 27, 2019 for U.S. Appl. No. 16/420,076.

Dean Jr., Joseph E., Non-Final Office Action mailed May 15, 2020 for U.S. Appl. No. 16/821,039.

Dean Jr., Joseph E., Non-Final Office action mailed Nov. 24, 2021 for U.S. Appl. No. 16/952,033.

Dean Jr., Joseph E., Non-Final Office Action mailed Oct. 26, 2021 for U.S. Appl. No. 16/952,032.

Dean, Jr., Joseph E., Final Office Action mailed Jan. 8, 2020 for U.S. Appl. No. 16/420,076.

Dean, Jr., Joseph E., Non-Final Office Action mailed Aug. 8, 2018 for U.S. Appl. No. 15/853,150.

Dean, Jr., Joseph E., Non-Final Office Action mailed Mar. 20, 2020 for U.S. Appl. No. 16/801,845.

Dean, Jr., Joseph E., Notice of Allowance and Fee(s) Due mailed Aug. 25, 2020 for U.S. Appl. No. 16/801,845.

Dean, Jr., Joseph E., Notice of Allowance and Fee(s) Due mailed Feb. 14, 2019 for U.S. Appl. No. 15/853,150.

Dean, Jr., Joseph E., Notice of Allowance and Fee(s) Due mailed Jan. 10, 2020 for U.S. Appl. No. 15/853,265.

Dean, Jr., Joseph E., Notice of Allowance and Fee(s) Due mailed Jan. 31, 2020 for U.S. Appl. No. 16/420,076.

Dean, Jr., Joseph E., Notice of Allowance and Fee(s) Due mailed Mar. 8, 2022 for U.S. Appl. No. 16/952,033.

Dean, Jr., Joseph E., Notice of Allowance and Fee(s) Due mailed Sep. 18, 2020 for U.S. Appl. No. 16/821,039.

Elahee, Md S, Non-Final Office Action mailed Jun. 11, 2020 for U.S. Appl. No. 16/240,457.

Elahee, Md S., Advisory Action mailed Dec. 16, 2020 for U.S. Appl. No. 16/240,457.

Elahee, Md S., Final Office Action mailed Sep. 17, 2020 for U.S. Appl. No. 16/240,457.

Mercado Vargas, Ariel, Final Office Action mailed Jan. 1, 2021 for U.S. Appl. No. 16/130,946.

Mercado Vargas, Ariel, Non-Final Office Action mailed May 12, 2021 for U.S. Appl. No. 16/130,946.

Mercado Vargas, Ariel, Notice of Allowance and Fee(s) Due mailed Oct. 14, 2021 for U.S. Appl. No. 16/130,946.

Singletary, Tyrone E., Non-Final Office Action mailed Dec. 24, 2021 for U.S. Appl. No. 17/076,762.

* cited by examiner

ALGORITHMICALLY OPTIMIZED DETERMINATION OF RESOURCE ASSIGNMENTS IN MACHINE REQUEST ANALYSES

FIELD

The present inventive subject matter relates generally to computer science, data science, data analytics, computer programming and software, computing clouds and platforms, machine and deep learning algorithms, and statistical and probabilistic mathematical analysis in computer software. More specifically, techniques for algorithmically optimized determination of resource assignments in machine request analyses are described.

BACKGROUND

In ever-increasing amounts, data is generated in ever-increasing amounts across almost numerous industries and economic sectors. Sophisticated and complex software, applications, programs, and platforms, including those that are locally hosted or physically or logically distributed across computing networks such as computing clouds, are being implemented to automate and improve processes that were previously intended to assist or help manage businesses, workflows, and procedures. However, conventional solutions have been limited in many respects with regard to analyzing data in order to generate efficient solutions for applying large amounts of data to business issues.

Conventionally, determining how to assign or allocate resources for use is typically performed manually or using less complex, less sophisticated software that employ manually input criteria or unsophisticated rules-based filters. Despite the development and increase in more sophisticated software, applications, programs, and platforms, conventional solutions often rely upon inaccurate input, rudimentary resource allocation logic, and generate results that often carry high levels of inaccuracy, inefficiency, and cost. In some conventional examples, professional services firms often rely upon the assignment of personnel to a given project or job based on numerous attributes and characteristics associated with the project and personnel available. However, the determination of personnel-to-project assignments is often inefficient, wasteful, and expensive, particularly when conventional solutions rely upon manual criteria input or, in many conventional solutions, simple rules-based filtering criteria, which may generate highly inaccurate resource assignments, regardless of the type of industrial, commercial, or consumer applications. In conventional solutions, the assignment of personnel to projects is not only non-optimized, but also computationally difficult.

In conventional solutions, resources available for a project, such as personnel, frequently exceed requests for those resources. Generating resource assignments (e.g., personnel, equipment, material, funding, schedule availability) using conventional solutions is computationally difficult due to the often sheer number of combinations that can be made. Typically, conventional solutions process all possible permutations and combinations of results for matching resources to the demand for them. Conventional techniques such as these, including exhaustive search are expensive to operate in time, cost, and personnel skill, experience, and training. The number of permutations of resource assignments can grow exponentially. For example, 5 resources assigned across 12 requests (i.e., $5^{12}$) can generate 244,140, 625 combinations making the determination of optimal, efficient resource assignments impractical using conventional solutions. In other applications, such as financial planning and analysis, allocation of assets to liabilities suffers from the same issues, among others, using inefficient conventional solutions. Conventional solutions can also incur high levels of education, training, and experience, investment, and other costs that are prohibitively high for many businesses, small and large. In logistics-related industries such as shipping or transportation, inefficient assignment of resources such as vessels, trucks, trailers, and ships experience high levels of inefficiency that can lead to backlogged deliveries, transportation delays, inefficient vehicle and vessel loading and offloading. Conventional techniques are generally inefficient because resources often have a greater number of requests for those resources, which leads to substantial computational difficulties. Due to the number of mathematical permutations and the exponential nature of generating combinations of assignments of resources for requests, a very large number of possible assignments could exist, which limits, if not altogether eliminates, efficient determination of how to assign resources to requests while minimizing cost and maintaining accuracy and highest level of efficacy in doing so. In other words, while computational costs can be high, the difficulty of understanding large amounts of data and making efficient decisions using conventional techniques is a growing problem creating inordinately higher costs.

Reliance upon conventional solutions using simple rules-based filter typically present large degrees and ranges of error by producing inefficiently high numbers of potential assignments (i.e., mathematically-determined combinations representing assignments or matches of resources to demands for those resources) and substantial cost and time efficiencies. Worse yet, many conventional solutions in many industries and economic sectors rely upon "brute force" or crude, manual determination of assignments of resources to requests using software, applications, programs, and platforms that are non-optimized and largely dependent upon the accuracy and efficacy of data that is filtered using manually-specified rules and manually-managed logic, which is inefficient and expensive in personnel, time, and costs.

Thus, what is needed is a solution to process large amounts of data to determine efficient allocation of resources without the limitations of conventional techniques.

BRIEF DESCRIPTION OF THE DRAWINGS

Various embodiments or examples ("examples") are disclosed in the following detailed description and the accompanying drawings.

DETAILED DESCRIPTION

Figure 1:
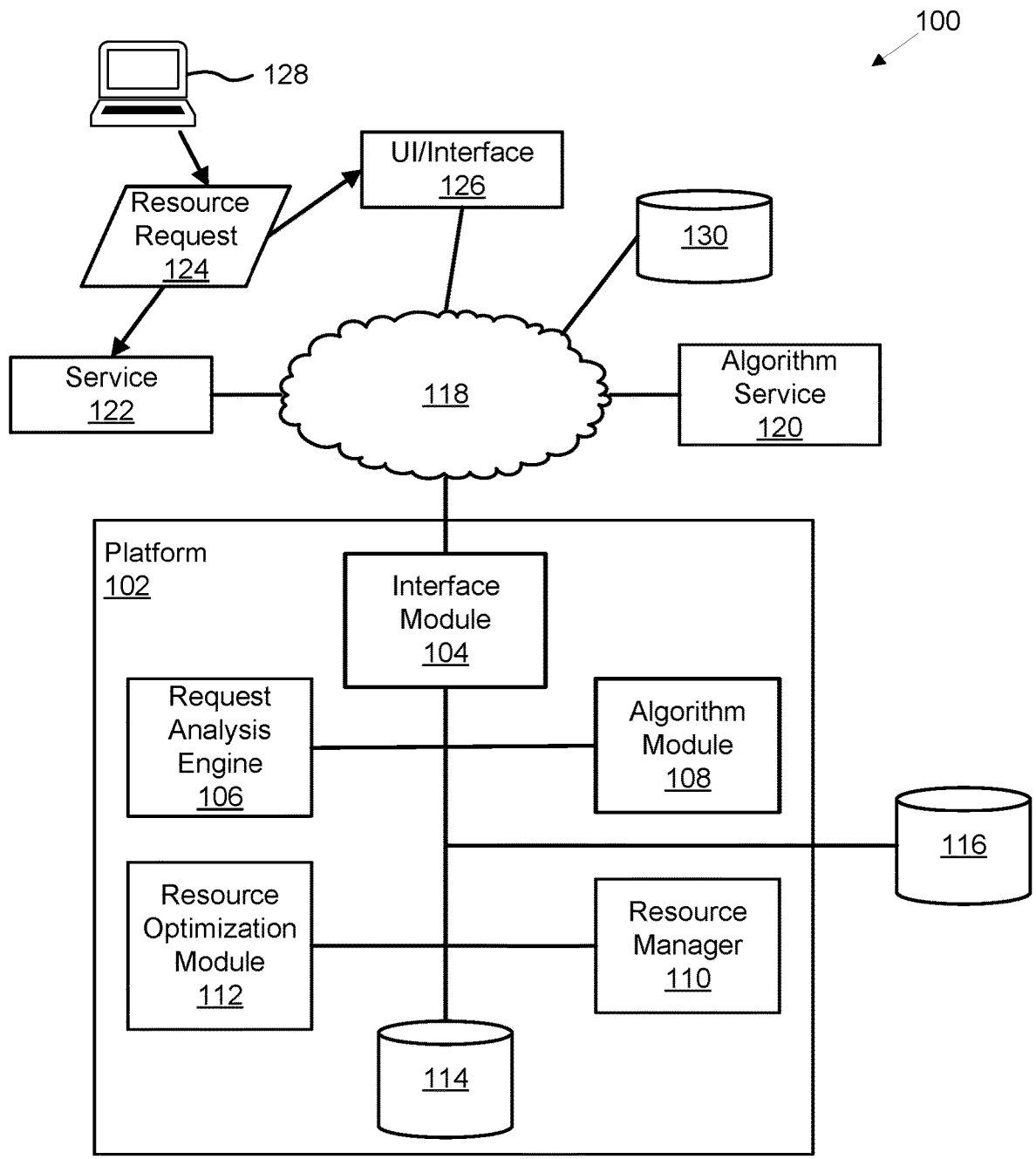
FIG. 1 illustrates an exemplary system for algorithmically optimized determination of resource assignments in machine request analyses.

Various embodiments or examples may be implemented in numerous ways, including as a system, a process, an apparatus, a user interface, or a series of program code or instructions on a computer readable medium such as a storage medium or a computer network including program instructions that are sent over optical, electronic, electrical, chemical, wired, or wireless communication links. In general, individual programmatic operations or sub-operations of disclosed processes may be performed in an arbitrary order, unless otherwise provided in the claims.

A detailed description of one or more examples is provided below along with accompanying figures. This detailed description is provided in connection with various examples, but is not limited to any particular example. The scope is limited only by the claims and numerous alternatives, modifications, and equivalents. Numerous specific details are set forth in the following description in order to provide a thorough understanding. These details are provided for the purpose of illustrating various examples and the described techniques may be practiced according to the claims without some or all of these specific details. For clarity, technical material that is known in the technical fields and related to the examples has not been described in detail to avoid unnecessarily obscuring the description or providing unnecessary details that may be already known to those of ordinary skill in the art.

As used herein, "system" may refer to or include the description of a computer, network, or distributed computing system, topology, or architecture using various computing resources that are configured to provide computing features, functions, processes, elements, components, or parts, without any particular limitation as to the type, make, manufacturer, developer, provider, configuration, programming or formatting language (e.g., Java®, JavaScript®, Python, PHP, HTML, XML, and others, without limitation or restriction), service, class, resource, specification, protocol, or other computing or network attributes. As used herein, "software," "application," and "program" may also be used interchangeably or synonymously with, or refer to a computer program, software, program, firmware, or any other term that may be used to describe, reference, or refer to a logical set of instructions that, when executed, performs a function or set of functions within a computing system or machine, regardless of whether physical, logical, or virtual and without restriction or limitation to any particular implementation, design, configuration, instance, or state. Further, "platform" may refer to any type of computer hardware (hereafter "hardware") and/or software using, hosted on, served from, or otherwise implemented on one or more local, remote, and/or distributed data networks and computing devices (e.g., servers and computers configured for data communication, generally) such as the Internet, one or more computing clouds (hereafter "cloud"), or others. Data networks (including computing clouds) may be implemented using various types of standalone, aggregated, physical or logically-grouped computing resources (e.g., computers, clients, servers, tablets, notebooks, smart phones, cell phones, mobile computing platforms or tablets, and the like) to provide a hosted environment for an application, software platform, operating system, software-as-a-service (i.e., "SaaS"), platform-as-a-service, hosted, or other computing, programming, or formatting environments, such as those described herein, without restriction or limitation to any particular implementation, design, configuration, instance, version, build, or state. Distributed resources such as cloud computing networks (also referred to interchangeably as "computing clouds," "storage clouds," "cloud networks," or, simply, "clouds," without restriction or limitation to any particular implementation, design, configuration, instance, version, build, or state) may be used for processing and/or storage of varying quantities, types, structures, and formats of data, without restriction or limitation to any particular implementation, design, or configuration. In the drawings provided herewith, the relative sizes and shapes do not convey any limitations, restrictions, requirements, or dimensional constraints unless otherwise specified in the description and are provided for purposes of illustration only to display processes, data, data flow chart, application or program architecture or other symbols, as described in this specification.

As described herein, structured and unstructured data may be stored in various types of data structures including, but not limited to databases, data repositories, data warehouses, data stores, or other data structures and facilities configured to manage, store, retrieve, process calls for/to, copy, modify, or delete data or sets of data (i.e., "datasets") in various computer programming languages and formats in accordance with various types of structured and unstructured database schemas and languages such as SQL®, MySQL®, NoSQL™, DynamoDB™, R, or others, such as those developed by proprietary and open source providers like Amazon® Web Services, Inc. of Seattle, Washington, Snowflake Inc., Microsoft®, Oracle®, Google®, Salesforce.com, Inc., and others, without limitation or restriction to any particular schema, instance, or implementation. Further, references to databases, data structures, or any type of data storage facility may include any embodiment as a local, remote, distributed, networked, cloud-based, or combined implementation thereof, without limitation or restriction. In some examples, data may be formatted and transmitted (i.e., transferred over one or more data communication protocols) between computing resources using various types of wired and wireless data communication and transfer protocols such as Hypertext Transfer Protocol (HTTP), Transmission Control Protocol (TCP)/Internet Protocol (IP), Internet Relay Chat (IRC), SMS, text messaging, instant messaging (IM), WiFi, WiMax, or others, without limitation. Further, as described herein, disclosed processes implemented as software may be programmed using Java®, JavaScript®, Scala, Perl, Python™, XML, HTML, and other data formats and programming languages, without limitation. As used herein, references to layers of an application architecture (e.g., application layer or data layer) may refer to a stacked layer application architecture designed and configured using models such as the Open Systems Interconnect (OSI) model or others.

The described techniques may be implemented as a software-based application, platform, or schema. In some examples, machine or deep learning algorithms such as those used in computing fields associated with "artificial intelligence" may be used. While there is no particular dependency to a given type of algorithm (e.g., machine learning, deep learning, neural networks, intelligent agents, or any other type of algorithm that, through the use of computing machines, attempts to simulate or mimic certain attributes of natural intelligence such as cognitive problem solving, without limitation or restriction), there is likewise no requirement that only a single instance or type of a given algorithm be used in the descriptions that follow. Algorithms may be machine or deep learning algorithms that are classified as, for example, supervised, unsupervised, or semi-supervised and trained or untrained using model data, external data, internal data, or other sources of data to improve the accuracy of calculations performed to generate output data for use in applications, systems, or platforms in data communication with software module or engine-based implementations. The described techniques within this Detailed Description are not limited in implementation, design, function, operation, structure, configuration, specification, or other aspects and may be varied without limitation. The size, shape, quantity, configuration, function, or structure of the elements shown in the various drawings may be varied and are not limited to any specific implementations shown, which are provided for exemplary purposes of illustration and are not intended to be limiting.

FIG. 1 illustrates an exemplary system for algorithmically optimized determination of resource assignments in machine request analyses. Here, system 100 includes distributed or cloud computing platform (hereafter "platform") 102, interface module 104, request analysis engine 106, algorithm module 108, resource manager 110, resource optimization module 112, data repositories 114-16, network 118, algorithm service 120, service 122, resource request 124, UI/interface 126, client 128, and data repository 130. As shown and described, the exemplary implementation of elements 100-130 is provided for purposes of illustrating the techniques described. Here, the number, configuration, type, topology, features, and functionality may be varied beyond the examples shown and described.

In some examples, resource request 124 may be sent from client 128 using UI/interface 126 to platform 102 over network 118. In some examples, resource request 124 may be data, metadata, attributes, or other data types, regardless of structure and programming or formatting language, that are generated by client 128 and requesting resource assignments (e.g., in response to resource request 124 for a given project, job, assignment, or the like, without limitation or restriction), which may be configured to assign personnel, equipment, material, materiel, services, currency, financing, funding, schedule availability of the above, or any other type of resource that can be used or assigned to a project, job, or activity for various purposes such as staffing, financial, logistics, transportation, travel, human resources-related, financial planning and analysis, manufacturing, and many others, without limitation or restriction. As shown, client 128 may be implemented as any type of computing device, which may be a server, desktop, laptop, mobile device, smart phone, or any physical or logical group thereof and data constituting resource request 124 may be sent using any type of programming and/or formatting language including, but not limited to, Java®, JavaScript®, Python, R, HTML, XML, and others. Using UI/interface 126, resource request 124 (e.g., data) may be transmitted over network 118 (which may be implemented as any type of local, remote, wide area, cloud-based, or other type of distributed computing data network) to platform 102.

In other examples, resource request 124 may also be transmitted from client 128 to service 122, which may be any type of software, application, platform, or service configured to receive, transform, transfer, and transmit data over network 118 with platform 102. In still other examples, resource request 124 or a copy thereof may also be transmitted over network 118 and stored in data repository 130. As shown, data repository 130 may be implemented using any type of database, data repository, data warehouse, data storage facility, or any other type of data structure configured to store structured or unstructured data. Further, data repository 130 may be implemented as a single instance (i.e., a standalone database, data warehouse, data repository, data storage facility, or others, without limitation or restriction) or as a distributed, physical or logical, network of multiple databases, which may be implemented using different types of data structures in order to convert, store, access, retrieve, or perform other operations on data of various types of data formats including, but not limited to those described above. In addition to converting, storing, accessing, retrieving, or performing other operations, data repository 130 may also be configured to operate with or on any data being transferred over network 118 to or from platform 102, algorithm service 120 (as described in greater detail below), service 122, UI/interface 126, or other applications or functionality beyond the examples shown and described.

In some examples, when resource request 124 is transmitted from client 128 to platform 102 over network 118, service 122 may be configured to convert or perform processing or pre-processing operations on data associated with resource request 124, including, but not limited to, parsing, formatting, transforming, or converting data from one data type, format, or structure to another. For example, when resource request 124 is transmitted from client 128, a request (e.g., resource request 124) may be structured according to a formatting or markup language such as HTML, XML, or the like. Service 122 may be configured to receive resource request 124 and transform, convert, format, or perform other data operations in order to transmit data to platform 102 using interface module 104. As an example, interface module 104 may be implemented to generate instructions in the form of computer software data or signals that are transmitted over network 118 to client 128 in order to generate and render for display on UI/interface 126. In other examples, interface module 104 may be configured to generate different or multiple interfaces on multiple clients or computing devices that are in direct or indirect data communication with platform 102.

In some examples, when platform 102 receives data (e.g., resource request 124), interface module 104 may be configured to receive, parse, process, format, and/or transmit data to one or more elements of platform 102 (e.g., request analysis engine 106, algorithm module 108, resource manager 110, resource optimization module 112, and data repository 114 and/or 116). For example, interface module 104 may be configured to parse resource request 124 to identify configuration data, filter data, data identifying characteristics, attributes, or criteria, ranking data, or other types, formats, and structures of data used by platform 102 to assign resources and transmit responsive data to client 128. For example, platform 102 may be configured to analyze, using request analysis engine 106, resource request 124 to parse unstructured data to identify how data contained within a data structure associated with resource request 124 may be identified and separated, classified, or otherwise used by platform 102 and elements 104-122 to search, filter, identify, and assign resources in response to a given request (i.e., resource request 124).

Here, request analysis engine 106 may be configured to use rules, logic, algorithm(s), or a combination thereof, based filters to apply criteria and other data (not shown) parsed from resource request 124 in order to identify and select data with matching criteria from data repository 114 and/or 116 using resource manager 110. In some examples, resource manager 110 may be configured to identify available resources based on whether data characteristics or attributes associated with those found when parsing resource request 124 in order to develop matches. For example, resource request 124 may include data indicating specific temporal or schedule availability associated with individual personnel or employees who can be assigned to a given project. Using quantitative or qualitative factors to indicate a degree or level of availability, resource manager 110 may be configured to retrieve resource data from data repositories 114 and/or 116 and, while in data communication and working cooperatively with request analysis engine 106 and resource optimization module 112, generate a set of resources that match the parsed criteria and attributes from resource request 124 in order to generate and send responsive data (not shown) from platform 102 to client 128 over network 118.

As an example, client 128 may transmit resource request 124 to platform 102 over network 118 using service 122 to convert, format, or transform data included within resource request 124 into an input format compatible for receipt by interface module 104 and analysis by request analysis engine 106. In some examples, platform 102 may be implemented using various types of programming and formatting languages such as Java, JavaScript, XML, Python, R, and/or others, without limitation or restriction, and service 122 may be configured to convert, format, or transform data included in resource request 124 for various programming languages and formats. Once received by platform 102 using, for example, interface module 104, request analysis engine 106 may be configured to parse resource request 124 to identify configuration, specification, criteria, characteristics, attributes, or other data that may be used by platform 102 to identify and select resources that can be assigned to a request (e.g., resource request 124). In some examples, there may be a constrained, limited, or otherwise restricted amount of resources available to assign in response to resource request 124, which, when analyzed by request analysis engine 106, may be configured to invoke resource optimization module 112.

Here, resource optimization module 112 is configured to receive input data (e.g., resource request 124, data from one or more of repositories 114-116 and 130) and invoke or call one or more other applications, algorithms, or services to generate resultant data indicative of resources assigned to resource request 124 in an optimal manner. In some examples, optimization of resource assignments may be performed by parsing resource request 124 to identify sub-datasets, metadata, attributes, criteria (for various purposes including normalizing data, applying numerical or statistical penalties, and the like, without limitation or restriction), weighting factors, and other data that may be used to identify and assign (i.e., determine) resources to resource request 124. In other examples, resource optimization module 112 may be configured to invoke algorithm module 108 or algorithm service 120 to apply one or more algorithms by resource optimization module 112 to generate resource assignments to resource request 124.

In some examples, algorithm module 108 and/or algorithm service 120 may be implemented to store, invoke, process, or otherwise use algorithms that are applied to data in resource request 124. For example, when algorithm module 108 (which may include proprietary or non-proprietary algorithms that are specific to platform 102) is invoked, various types of algorithms may be applied, when called, by interface module 104, request analysis engine 106, resource manager 110, and/or resource optimization module 112. In some examples, algorithms invoked, when called, invoked, run, executed, or otherwise applied by algorithm module 108 in response to instructions from one or more modules of platform 102, may be configured to perform types of functions (e.g., cost functions) that can apply or adhere to criteria such as weighting rules, numerical penalties, time ranges, resultant data ranges, or others that can result in numerical variable input to a given algorithm. For example, a query may be initiated in response to data parsed from resource request 124 against data stored in repositories 114-116 and/or 130. Data stored in repositories 114-116 and/or 130 may include data associated with individual, groups, batches, sections, sectors, partitions, of resources (e.g., personnel, employees, professional service providers, financial, material, economic, manufacturing, and many others, without limitation or restriction). Queries generated by request analysis engine 106 and resource optimization module 112 may invoke algorithms (i.e., using algorithm module 108) to run against one or more of queries 114-116 and/or 130. In some examples, numerical penalties may be input to one or more algorithms called, invoked, run, executed, or otherwise applied by algorithm module 108 if a given resource is not suitable for resource request 124, regardless of the criteria data parsed from resource request 124. In other examples, other criteria parsed from resource request 124 by platform 102 may be used to generate filters, rules, criteria, characteristics, or attributes that are used as guidance or control data to one or more algorithms that are used to generate queries of repositories 114-116 and/or 130 in order to identify resources that are responsive to resource request 124. Resources that are identified responsive to resource request 124 may be presented on UI/interface 126, which can be configured for display on client 128, the latter of which may be any type of computing device (e.g., desktop, laptop, notebook, mobile, personal, server, or others, without limitation or restriction).

In some examples, if resource request 124 includes data initiating a query for assignment of personnel to a professional services project, numerical penalties may be assigned to individual personnel data for individuals who do not possess required skills, certifications, experience, or other characteristics identified by data within resource request 124 for a given project. As another example, numerical penalties may also be assigned according to a gradation or scale in order to weight data associated with a given resource relative to resource request 124.

In other examples, algorithm module 108 and/or algorithm service 120 may be implemented with other types of algorithms that may be invoked and executed against data parsed from resource request 124 and data extracted from repositories 114 and/or 116 as directed by resource manager 110 (i.e., by algorithm module 108 and/or algorithm service 120 (when called)) include others such as those that simulated annealing.

In some examples, some algorithms that may be used by platform 102 may be those that are atypical to resource optimization. For example, simulated annealing algorithms developed for materials science and materials engineering applications may be used to identify resources in response to queries generated based on data parsed from resource request 124 by platform 102. Here, simulated annealing or other types of algorithms (e.g., random, most suitable, exhaustive, among others) may be also stored in one or more of repositories 114-116 and/or 130. When called, invoked, run, executed, or otherwise applied (hereafter "called) by algorithm module 108 or algorithm service 120 in response to control signals or data from request analysis engine 106 and/or resource optimization module 112, algorithms may be retrieved from and run against data stored on one or more repositories (e.g., repositories 114-116, 130).

For example, a simulated annealing algorithm may be called by algorithm module. In some examples, a simulated annealing algorithm may be configured to start by selecting a random resource based on data stored in one or more of repositories 114-116 and/or 130. After selecting a random resource (i.e., a solution), a function (i.e., an algorithm, formula(e), process, protocol, method, or procedure used to process data from the selection of the random resource by a selected algorithm(s)) may be applied to determine an attribute, characteristic, or criteria associated with the selected random resource. As used herein, an attribute, characteristic, or criteria may be identified from data parsed from resource request 124 and include various types including, but not limited to, cost, time, availability, schedule, skill, expertise, physical characteristics or dimensions, functional characteristics or dimensions, financial, or other the like, without limitation or restriction.

In some examples, using a simulated annealing algorithm, once selected, a random adjustment (e.g., adding, deleting, modifying, or performing another data operation) to the data associated with the selected random resource, which may be identified as a "move." After making a "move" to the data associated with the selected random resource (e.g., modifying data attributes associated with criteria or requirements for the selection of resources to be assigned in response to resource request 124), a cost differential may be calculated. In an example, where cost is being used as criteria data to identify one or more resources responsive to resource request 124, if the cost differential results in a lowered cost, the move to the data associated with the selected random resource may be accepted (i.e., acceptance of a move may be a change, addition, or deletion to the data that is committed and stored in one or more of repositories 114-116). In contrast, if the cost (as an example) differential applies a cost increase to the cost of the selected random resource (i.e., solution), then the move may be undone, reversed, rescinded, or deleted with no resulting change to the cost. However, data may be generated by request analysis engine 106 and resource optimization module 112 that is returned using interface module 104 to transmit data from platform 102 to client 128, which is then rendered on UI/interface 126. Various types of techniques may be used to present, visually or otherwise, resultant data (i.e., data output from the application of one or more algorithms by algorithm module 108 to identify resource data that is associated with resources that comply or otherwise are responsive to resource request 124 may be referred to as "resultant" or "result" data, as used herein, without limitation or restriction). For example, resultant data may be presented on a "heat" map or using a schedule-style view presenting a solution (i.e., resources that are identified and returned in response to resource request 124) on a visual display (not shown). In other examples, different techniques to present resultant data may be used and are not limited to the techniques shown or described.

In some examples, a display presented on UI/interface 126 may be a text or other type of input field that requests user input as to whether an increased cost due to an increase identified when calculating a cost differential should be accepted (i.e., committed and identified as an assignable resource responsive to resource request 124). The above-described process for applying a simulated annealing algorithm can be repeated multiple, few, or many times in order to identify increasingly smaller cost differentials in order to generate a field of resources that are increasingly accurate as solutions or assignable resources responsive to resource request 124. Further, algorithm module 108 and/or algorithm service 120 may be configured to combine or use multiple or different types of algorithms when parsing and processing resource request 124, evaluating available resources from data stored in repositories 114-116 by, in some examples, resource manager 110.

As shown, resource request 124 may be composed of data requesting assignment of resources to a project, requirement, plan, program, application, or other need of assignable resources. In some examples, a human resources or staffing-related project may require assignment of personnel having specific attributes (e.g., education, role, region, training, status, availability, rank, cost, or others, without limitation or restriction), which may result in the generation by client 128 of resource request 124 when a user inputs information or data using, in some examples, data fields within an application, menu selections, pull down menus, or other graphical user interface (hereafter "GUI") or interface interactive display and input techniques, without limitation or restriction. Data included in resource request 124 may be input using UI/interface 126 in one programming or formatting language, but then converted or transformed into another using service 122 or another application, platform, or service in data communication with network 118 (e.g., algorithm service 120). In some examples, data included in resource request 124 may also be stored, partially or entirely, in repository 130 or another repository in data communication with platform 102 (e.g., repository 114-116), which may be managed by resource manager 110. In other examples, resource request 124, as shown, may constitute a single or multiple requests for resource assignments to a given project (not shown). Resource request 124, as shown, may be implemented as data associated with one or more requests to assign resources to a given project, regardless of data type, data format, data structure (e.g., packets, frames, segments, and others, without limitation or restriction). For example, resource request 124 may be formatted and structured to work with programming languages such as Java®, JavaScript®, Python™, or others, without limitation or restriction. Further, resource request 124 may constitute structured or unstructured data types and formats, without limitation or restriction. In other examples, the above-described elements may be varied in function, structure, configuration, quantity, topology, or other attributes and are not limited to the examples shown and described, which are provided for explanatory purposes.

Figure 2A:
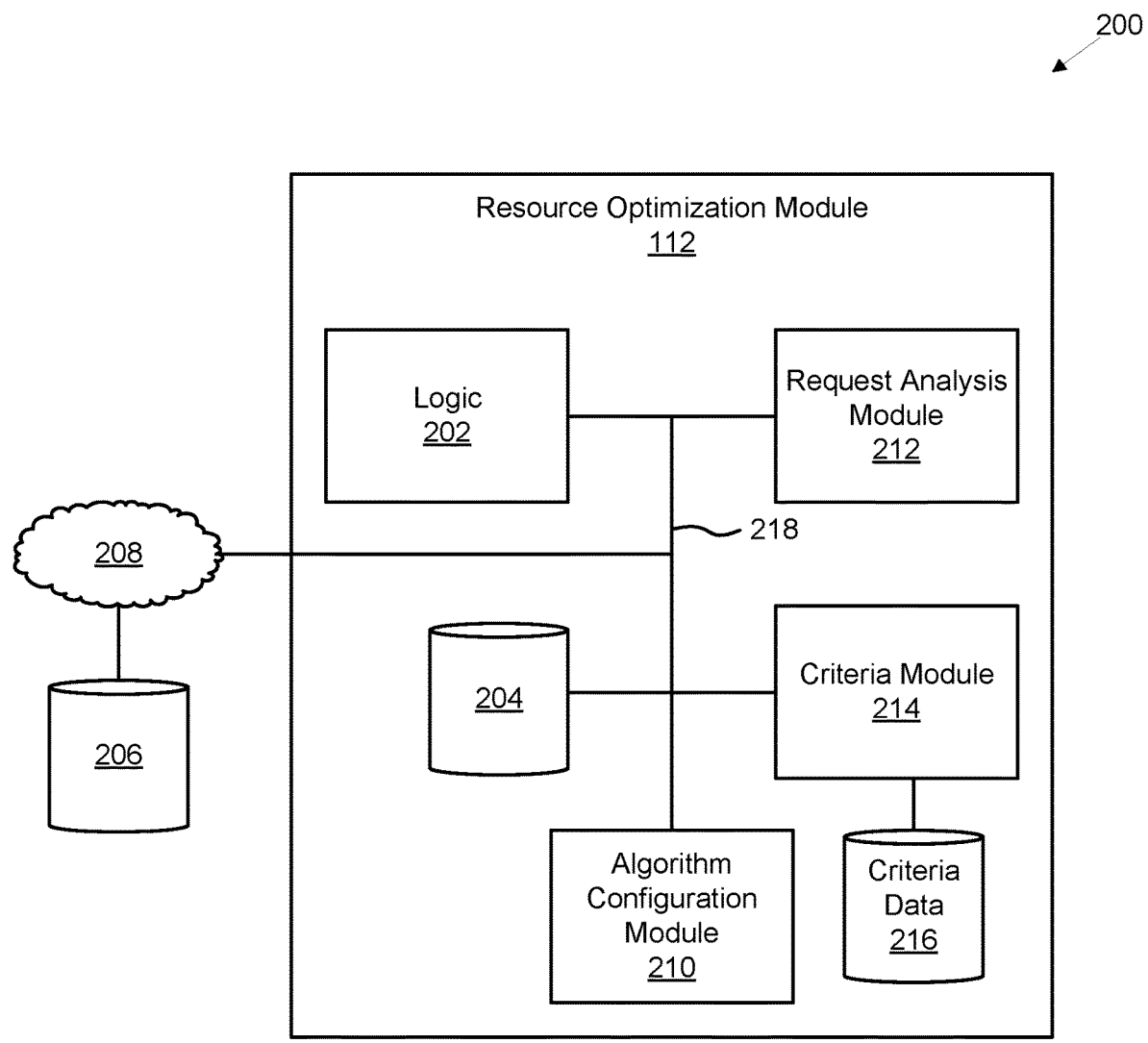
FIG. 2A illustrates an exemplary application architecture for algorithmically optimized determination of resource assignments in machine request analyses.

FIG. 2A illustrates an exemplary application architecture for algorithmically optimized determination of resource assignments in machine request analyses. Here, application architecture 200 includes resource optimization module 112 (FIG. 1), which houses logic module 202, repositories 204-206, network 208, algorithm configuration module 210, request analysis module 212, criteria module 214, criteria data repository 216, and bus 218. In some examples, resource optimization module 112 may be implemented in function and structure as described above in connection with FIG. 1. Further, like-named and like-numbered elements may be implemented and configured similarly to each other, without limitation or restriction.

As shown, resource optimization module 112 (FIG. 1), may be implemented with logic module 202, repository 204, algorithm configuration module 210, request analysis module 212, criteria module 214, and criteria data repository 216. In some examples, elements 202-216 may be implemented as separate, standalone programs, applications, code packages, or other programmatic encapsulations that are in data communication with each other and configured to transfer data over bus 218. For example, repository 204 may be locally configured data repository, data warehouse, database, or any other type of data storage facility that is configured to store data received by, transmitted from, or used by one or more of elements 202-216 as shown in resource optimization module 112. In other examples, external elements such as data repository 206 may be coupled to (e.g., in data communication with) resource optimization module 112 over network 208, the latter of which may be implemented as any type of data network, cloud computing network (i.e., "cloud"), or other data networking topology, without limitation or restriction.

As shown, resource optimization module 112 and elements 202-218 may be implemented and configured for various features and functionality (such as those described) using different types of programming and/or formatting languages such as Java®, JavaScript®, Python, RDF, C#, C, C++, R, Ruby, MATLAB, and others, without limitation or restriction. As software modules (hereafter "modules") or engines (i.e., programs that are configured to perform a process or set of processes) configured to perform individual or specific functions that, when acting in concert, achieve the techniques described herein, resource optimization module 112 and elements 202-218 may be implemented to match data associated with resources (i.e., data associated with resources that can be used to identify and manage the provision of said data by, for example, resource manager 110 (FIG. 1) querying, storing, accessing, adding, deleting, modifying, or performing other operations on data stored in one or more of repository 204 (e.g., in direct or indirect data communication, locally configured, or the like) or 206 (e.g., remote, distributed, cloud, or the like)) with requirements parsed and processed from a resource request (e.g., resource request 124 (FIG. 1).

Referring back to FIG. 2A, logic module 202 may be implemented using various types of programs or processes configured to manage one or more of elements 204-218 for resource optimization module 112. In some examples, logic module 202 may be configured to use rules, rules-based filtering, system-generated rules, user-specified rules, or other filters or criteria in order to generate decisions used by resource optimization module 112 to assign resource(s) to a given resource request (e.g., resource request 124 (FIG. 1)). In other examples, logic module 202 may generate instructions to algorithm configuration module 210, which may be implemented to identify, select, use, or apply various types of algorithms when determining resources to assign to a request. Examples of algorithms that may be used are ranking, matching, scoring, filtering, machine learning, deep learning, or others, including algorithms that are modeled on atypical processes such as simulated annealing or others as described herein, without limitation or restriction. In still other examples, different types and categories may also be used individually or in combination, and are not limited to the examples shown and described.

Repositories 204-206 may be implemented as local or remote data repositories and the distributed topology of placing repository 206 in indirect data communication with resource optimization module 112 over network 208 is provided for purposes of illustration and example. Logic module 202, algorithm configuration module 210, request analysis module 212, and criteria module 214 may be configured to transfer data to or from any of the data repositories shown, regardless of whether locally implemented (i.e., in direct data communication with one or more of elements 202-218) or remotely implemented or implemented in accordance with a distributed data topology such as repository 206 over network 208. Further, repositories 204-206 may also be implemented to store one or multiple data types and formats and may include programs configured to perform data type or data format conversion (not shown).

Other repositories that may be implemented include criteria data 216, which may be configured to store criteria identified from a given resource request (e.g., resource request 124 (FIG. 1)) to help identify criteria (e.g., characteristics, attributes, requirements, or the like) used to identify, select, and assign resources responsive to a request. Examples of criteria that may be parsed from a resource request (e.g., resource request 124 (FIG. 1) include name, status, availability, rank, region, role, cost rate, willingness to travel, external factors, and others, without limitation or restriction. As described in further detail below, an interface may be generated by UI/interface 126 to be rendered (i.e., displayed or presented) on client 128 with one or more input fields, forms, or other graphical elements that are configured functionally to receive input (e.g., textual, audio, audio-to-text converted, graphical, visual, video, or others, without limitation or restriction) that may be used by criteria module 214 such as resource filters that permit entry of desired criteria to filter resources for a given request. In other examples, an interface (not shown) may also be configured in which not only are filtering criteria presented for identifying resources, but weighting factors (e.g., system-set or user-specific priority(s), skill(s), availability, and others), normalizing factors, scores, thresholds, percentages (e.g., percentage matching), probabilities, and other factors may also be input. Once determined, resources assignable to resource request 124 (FIG. 1) may be presented in any manner (e.g., randomly listed, ordered, presented in a stacked ranked order, or others, without limitation or restriction) on UI/interface 126 (FIG. 1) on client 128 (FIG. 1) or another client or computing device having a display.

Referring back to FIG. 2A, in some examples, request analysis module 212 may be a computer program, application, software, programmatic thread or set of threads or processes that are configured to transfer data to and from request analysis engine 106 (FIG. 1), which performs the initial parsing and processing of a request (e.g., resource request 124 (FIG. 1)) upon receipt by interface module 104 (FIG. 1). Here, request analysis module 212 receives data from request analysis engine 106 (FIG. 1) and, in some examples, with instructions from logic module 202, performs data analysis that not only identifies criteria to be stored in criteria data repository 216 by criteria module 214, but also provides data parsed, processed, and retrieved from a resource request (e.g., resource request 124 (FIG. 1)) by request analysis engine 106 (FIG. 1) to algorithm configuration module 210, which identifies and applies one or more algorithms (regardless of algorithm type) in order to generate resultant data that identifies, ranks, weights, scores, lists, presents, or performs other operations on resources that are assignable to a request. In other examples, the above-described elements may be varied in function, structure, configuration, quantity, topology, or other attributes and are not limited to the examples shown and described, which are provided for explanatory purposes.

Figure 2B:
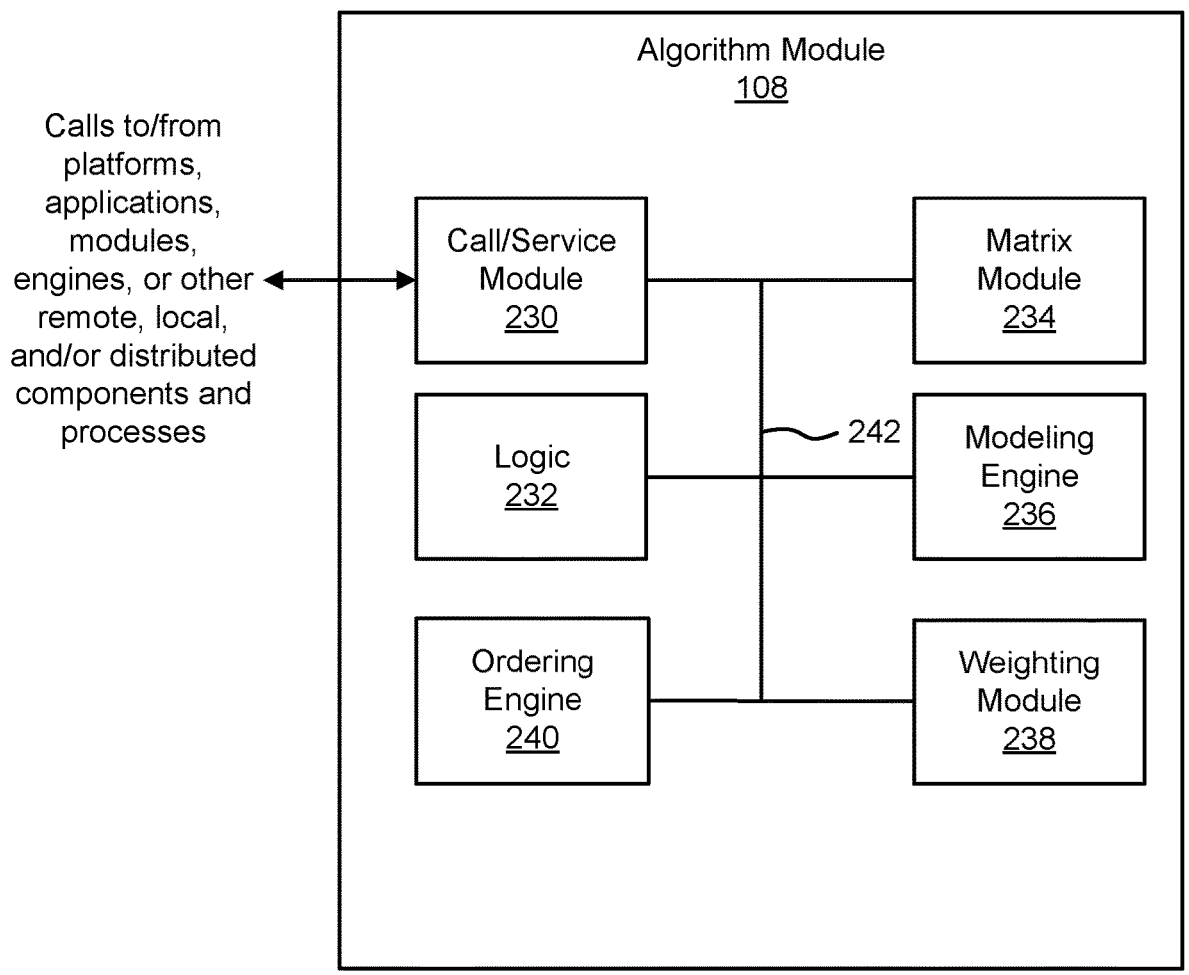
FIG. 2B illustrates an exemplary algorithm module for algorithmically optimized determination of resource assignments in machine request analyses.

FIG. 2B illustrates an exemplary algorithm module for algorithmically optimized determination of resource assignments in machine request analyses. In some examples, algorithm module 108 includes call/service module 230, logic module 232, matrix module 234, modeling engine 236, weighting module 238, ordering engine 240, and bus 242. As shown and described, like-named and like-numbered elements may be implemented and configured similarly to each other, without limitation or restriction. Here, algorithm module 108 may be implemented similarly to the element shown and described above in connection with FIG. 1 or differently, without restriction or limitation.

In some examples, algorithm module 108 may be implemented as part of the architecture of platform 102 (FIG. 1) on one or more computing servers or other computing devices that may be physically or logically coupled together over a local, remote, distributed, or cloud-based computing topology. When implemented, algorithm module 108 may be designed, configured, and invoked to apply one or more algorithms (such as those described above) to query one or more repositories to identify, select, retrieve, and process data associated with resources that may be assigned to a given request. Resource optimization module 112 (FIGS. 1, 2A) provides instructions to logic module 232, which in turn provides other instructions to one or more of call/service module 230, matrix module 234, modeling engine 236, weighting module 238, or ordering engine 240 over bus 242 in order to call, invoke, instance, run, execute, or otherwise generate an instruction (hereafter "call") to a given algorithm or algorithm service to process criteria, characteristics, and/or attributes of a given resource request (e.g., resource request 124 (FIG. 1)) to determine resources that are a suitable match. As used herein "suitable" may refer to a numerical level or degree of matching that falls within a given tolerance, threshold, probability, range, or the like that is identified from data included in resource request 124 (FIG. 1), which may result from applying one or more algorithms or algorithm services to stored data (i.e., in repositories 114-116, 130 (FIG. 1), repositories 204-206 (FIG. 2A), or others, without limitation or restriction) associated with resources, which may or may not be available. For example, using edge computing techniques, a distance between a data point associated with a given resource and another data point associated with resource request 124 (FIG. 1) may be calculated. Using comparative analysis techniques and repetitive distance and edge computations/calculations, one or more resources may be identified that match the requirements (e.g., criteria, characteristics, attributes, or the like) of resource request 124 (FIG. 1). Further, algorithms and algorithm services may be implemented using various types of algorithms such as those described herein. In some examples, an algorithm service may be an application, program, platform, or service that is not implemented as part of platform 102 (FIG. 1), but is instead invoked when a data call or signal is generated by call/service module 230 and transmitted from platform 102 to algorithm service 120 (FIG. 1). In other examples, an algorithm service may also be implemented internally (not shown), but is neither a limitation nor a restriction on the described techniques.

In some examples, when an algorithm or algorithm service (not shown) are called, matrix module 234 may be invoked to generate a suitability matrix that presents data associated with resources and criteria thereof. Using a suitability matrix generated by matrix module 234, a data model for a given resource request (e.g., resource request 124) may be generated by modeling engine 236 against which one or more algorithms or algorithm services may be run in order to generate resultant data (e.g., data resulting from the application of a given algorithm or algorithm service that identifies resources that are "optimally" assigned to a given resource request (e.g., resource request 124 (FIG. 1); for exemplary purposes, "optimally" or "optimal" assignment of resources may refer to the above-described algorithmically-generated process(es) of identifying and calculating resources that are responsive to criteria, filters, and other factors such as those described herein)). In some examples, a suitability matrix generated by matrix module 234 may be a tabular, columnar, or other type of data structure that is configured to house data associated with criteria, characteristics, and attributes of individual resources that can be used to consistently and, with low latency, execute called (i.e., by call/service module 230) algorithms or algorithm services against said data in accordance with one or more data models generated by modeling engine 236.

Here, modeling engine 236 may be configured to generate one or more data models that provide parameters, configuration data, and other data used by resource optimization module 112 (FIG. 1, 2A) and algorithm configuration module 210 (FIG. 2A) to run one or more algorithmic processes (e.g., algorithm or algorithm service) against data associated with resources (i.e., stored in one or more of repositories 114-116, 130 (FIG. 1), 204-206 (FIG. 2A), or others). In some examples, algorithms and/or algorithm services may be run against data stored in the above-described repositories or against copies thereof, without limitation or restriction. Further, when algorithms or algorithm services are used to process data associated with one or more resources relative to resource request 124 (FIG. 1), weighting module 238 may be designed, implemented, and/or configured to apply weighting factors such as criteria or requirements generated from parsing resource request 124 (FIG. 1), which may be system-set or user-specific. Examples of weighting criteria may include, but is not limited to, indicating factors by user input provided through UI/interface 126 (FIG. 1) or automatically generating criteria based on prior resource requests, which is exemplary of applications of machine learning, deep learning, and other algorithms that can be trained against internal (i.e., to platform 102) and/or external data. In some examples, weighting factors may be generated and applied to a data model by weighting module 238, with numerical values assigned to priority(s), skill(s), availability, normalizing factors, scores, thresholds, percentages (e.g., percentage matching), probabilities, and the like, without limitation or restriction.

In some examples, algorithm module 108 may also be configured, using ordering engine 240, to generate a display of resultant data illustrating resources assigned to a given resource request (e.g., resource request 124 (FIG. 1)). In some examples, ordering engine 240 may generate a list of resources that are presented in different types of lists, ranks, or orders. For example, ordering engine 240 may take the output (i.e., resources identified by applying algorithms or algorithm services to a data model generated by modeling engine 236 using a suitability matrix of criteria, characteristics, or attributes generated by matrix module 234, in some examples) of data associated with one or more resources identified as being responsive to a given resource request (e.g., resource request 124 (FIG. 1)) and list the identified resources in a stack/stacked ranked order. In other examples, resources that are identified as being suitably matched relative to resource request 124 (FIG. 1) may be presented in a random order. In further examples, a list of resources that match the criteria or requirements identified from parsing resource request 124 (FIG. 1) may also include generating data that, when rendered on UI/interface 126 (FIG. 1) illustrates matching or identified resources that fall within various tiers, groups, percentages, ranges, or the like. Yet other examples, enable ordering engine 240 to present identified resources in a graphical, tabular, video, audible, multi-media, or other manner that presents resources based on an analysis of those that have a lowest cost, best match based on skills, region, availability, or other criteria, best match based on using simulated annealing-based algorithms, and others, without limitation or restriction. In other examples, the above-described elements may be varied in function, structure, configuration, quantity, topology, or other attributes and are not limited to the examples shown and described, which are provided for explanatory purposes.

Figure 3:
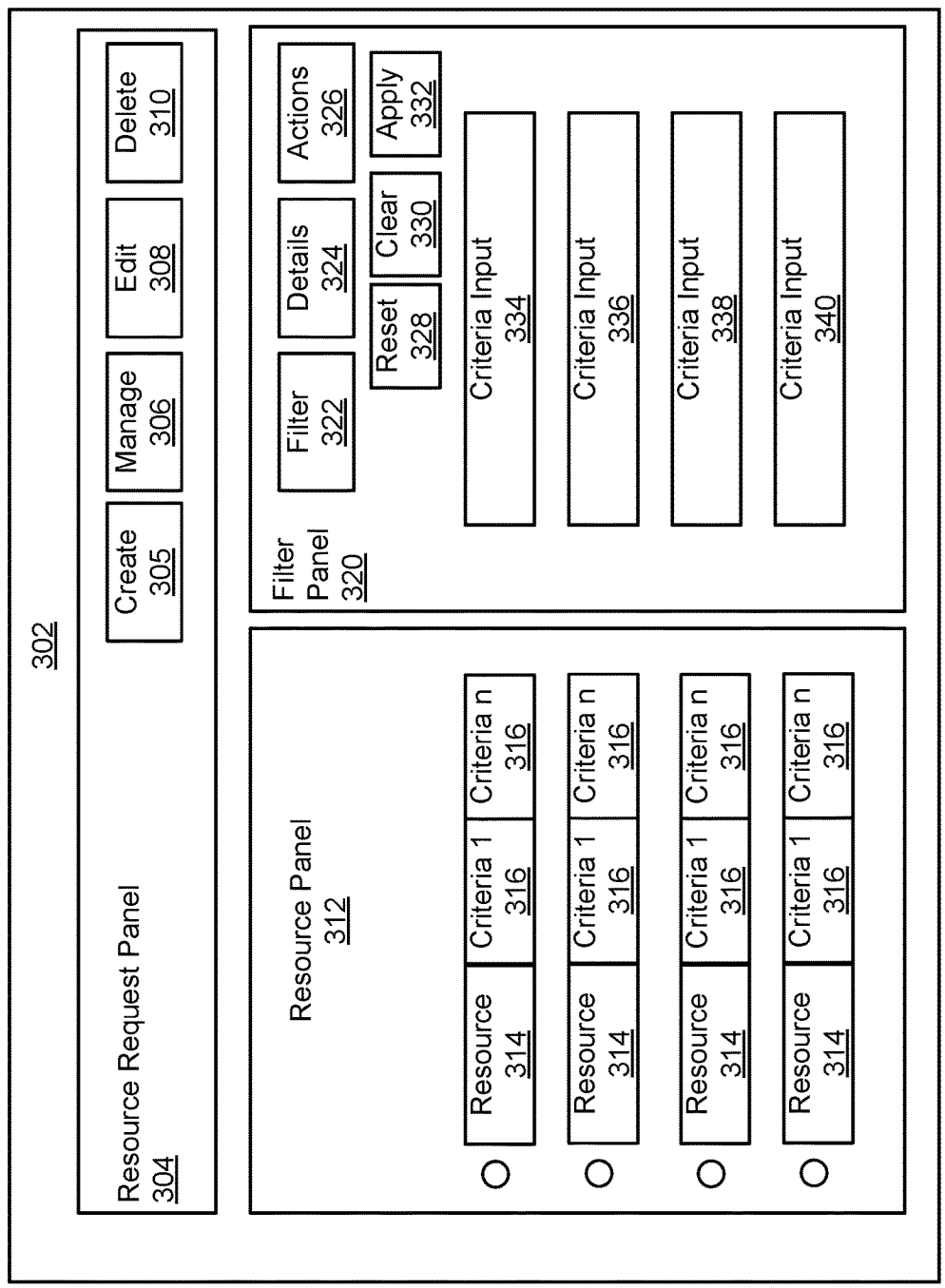
FIG. 3 illustrates an exemplary user interface for algorithmically optimized determination of resource assignments in machine request analyses.

FIG. 3 illustrates an exemplary user interface for algorithmically optimized determination of resource assignments in machine request analyses. Here, interface 300 illustrates window 302, resource request panel 304, actions 305-310, resource panel 312, resource fields 314, criteria fields 316, filter panel 320, filter actions 322-332, and criteria input fields 334-340. In some examples, interface 300 may be implemented as an example of an interface presented on client 128 (FIG. 1) (e.g., UI/interface 126 (FIG. 1), or the like) that may be used to input data to generate resource request 124 (FIG. 1). Window 302, in some examples, may be presented on a display associated with, for example, client 128 (FIG. 1). Within window 302, as an example, sub-windows or panels such as resource request panel 304, resource panel 312, and filter panel 320 may be displayed. Generation, rendering, and display data for window 302 and elements 304-340 may be provided by interface module 104 (FIG. 1) and transmitted to one or more client display devices (e.g., UI/interface 126 on client 128) that are in direct or indirect data communication with platform 102 (FIG. 1).

Referring back to FIG. 3, for example, when generating a resource request, display buttons presented in resource request panel 304 can be implemented with interactive graphical elements such as display "buttons," radio buttons, input text fields, pull down menus (not shown), or the like, without limitation or restriction. In some examples, actions 305-310 may be configured to receive input from an input/output device (not shown) such as keyboard, mouse, keypad, or other interface device or application to create, manage, edit, or delete a resource request. Further, resource fields 314 and criteria fields 316 in resource panel 312 may be configured to receive user input regarding a given resource and criteria associated with the selection of that resource. For example, in a professional services project, resource fields 314 and criteria fields 316 may be used to indicate professional services personnel (i.e., as examples of resources) with varying levels of experience, disposed in different locations, with various levels of experience, and having specialties, experience, or credentials that may be desired for a given project. Criteria used for establishing requirements for a given resource request can be entered into criteria fields 316 and, although 4 rows of input for defining resources are shown, the number, quantity, size, configuration, spacing, location, and other display parameters related to resource panel 312, resource fields 314, and criteria fields 316 may be varied and are not limited to the examples shown and described.

Here, window 302 also includes filter panel 320, which includes other areas, elements, or features that may be configured to specify and configure filters that are included in resource request 124 (FIG. 1). Referring back to FIG. 3, input may be provided (using any type of data input technique, some of which were described above) to provide criteria input (e.g., ranges, amounts, values, and the like, without limitation or restriction) in criteria input fields 334-340. Further, one or more filters may be created, detailed, or managed by providing an input (i.e., selection, "pressing," "depressing," or otherwise interacting using an interactive input/output device such as those described above, without limitation or restriction) to one or more of filter actions 322-332. For example, selecting filter action 322 may be configured to generate or create a filter to be incorporated with a given resource request. Filter action 324, as another example, may be selected to provide additional details (without limitation or restriction) of a given filter. Still further, filter action 326 may be another button, tab, window, panel, or other interactive element that displays additional information and available options or actions to a user with regard to managing a given filter. Filter actions 328-330, as additional examples, enable functionality to reset, clear, or apply a given filter, respectively, which may be transmitted as control data or data signals to platform 102 (FIG. 1) from UI/interface 126 (FIG. 1) from client 128 (FIG. 1). In other examples, window 302 and the above-described elements 304-340 may be varied in size, shape, display, function, structure, configuration, quantity, topology, or other attributes and are not limited to the examples shown and described, which are provided for explanatory purposes.

Figure 4:
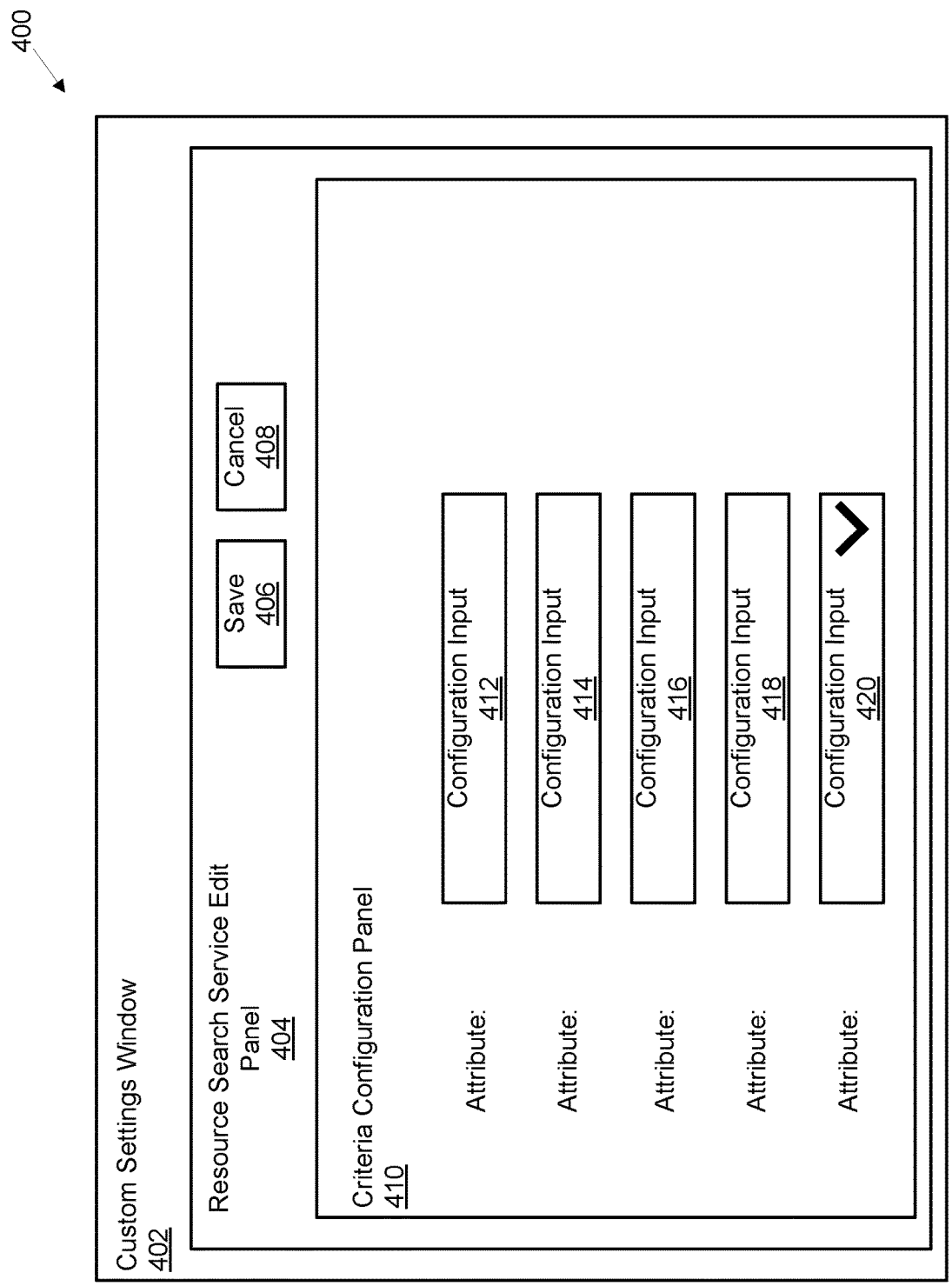
FIG. 4 illustrates another exemplary user interface for algorithmically optimized determination of resource assignments in machine request analyses.

FIG. 4 illustrates another exemplary user interface for algorithmically optimized determination of resource assignments in machine request analyses. Here, interface 400 is shown with custom settings window 402, resource search service edit panel 404, action elements 406-408, criteria configuration panel 410, and configuration input fields 412-420. In some examples, input data may be generated and included in resource request 124 (FIG. 1) using interface 400. Resource requests (e.g., resource request 124 (FIG. 1)) may be configured to include custom data or settings (e.g., criteria, filters, attributes, characteristics, parameters, and the like), which are subsequently sent to platform 102 (FIG. 1) for use by resource optimization module 112 (FIGS. 1, 2A) to identify and generate resultant data identifying potential resources assignable to resource request 124 (FIG. 1) may be input, edited, modified, or otherwise subjected to various data operations, without limitation or restriction, using interface 400.

In some examples, interface 400 may be presented on UI/interface 126 (FIG. 1) on client 128 (FIG. 1) and used to generate resource request 124 (FIG. 1) and include custom settings, data, and/or criteria. For example, custom settings window may be invoked when navigating other interfaces (e.g., interface 300 (FIG. 3)), which may have an interactive graphical element such as a menu, pull-down menu, minimized list, radio button, text entry field, voice-to-text input field, or the like that, when selected, generates data from interface module 104 (FIG. 1) on platform 102 (FIG. 1) that is sent over network 118 (FIG. 1) to UI/interface 126 (FIG. 1). Once received at client 128, data may be used to generate, render, and display custom settings window 402 on UI/interface 126 (FIG. 1) at client 128 (FIG. 1). Presented within custom settings window 402 is resource search service edit panel 404, which includes action elements 406-408, the latter of which may be implemented and configured as interactive elements that are used to save or cancel input data for providing custom settings to resource request 124 (FIG. 1). For example, after input is provided in criteria configuration panel 410 and configuration input fields 412-420, action 406 may be used to receive an input using an input/output device such as a mouse, touchpad, keyboard, or the like, which saves the custom settings specified in configuration input fields 412-420. As shown, configuration input fields 412-420 may be used to provide or include custom criteria in a resource request (e.g., resource request 124 (FIG. 1)). Input to configuration input fields 412-420 may be input or entered using various techniques including, but not limited to, structured or unstructured data or text input (e.g., configuration input fields 412-418), pull-down menus (e.g., configuration input field 420), voice-to-text conversion (not shown), auto-detected input entry using, for example, machine learning, deep learning, or other algorithmic techniques that are trained against internal or external data, or others, without limitation or restriction. Alternatively, action 408 may be selected to cancel an entry for including custom settings or other-related configuration or criteria-related data with a resource request.

As shown, criteria configuration panel 410 may be designed, implemented, and/or configured to receive one or more configuration input fields (e.g., configuration input fields 412-420), the latter of which may be implemented using different layouts, functionality, features, configuration, or other characteristics beyond those shown and described. Here, criteria (i.e., criteria, characteristics, attributes, etc.) may be entered as "attributes" that are defined based on configuration input in configuration input fields 412-420. For example, resource request 124 (FIG. 1) may be constructed with a custom setting entered in configuration input field 412 that identifies, as an attribute, a specific region for a given project, job, or assignment associated with the request for resources. Entering a region name in configuration input field 412 and interacting with action 406, enables criteria for a given region to be transformed into data that is included with resource request 124 (FIG. 1), for example, prior to transmission to platform 102 over network 118. As a further example, criteria requirements may also be input into configuration input field 420 by selecting an option from a pull-down list or menu of options, which may present specific criteria that can be selected or enable other functionality with which further interactions can occur. For example, selecting an option in a pull-down menu associated with configuration input field 420 may invoke another input option that runs a further script or application that provides another interactive element for input/entry of additional criteria or criteria configuration data. For example, configuration input field 420 may provide a pull-down menu for a geographic region that is described based on different continents. Selecting "North America" may invoke or execute another code branch (i.e., software, application, script, applet, or the like) that presents another pull down menu to select either "United States of America" or "Canada." Other interactive elements may be presented and are not limited to those shown and/or described, which are provided for purposes of illustration and example, without limitation or restriction. In still other examples, interface 400 and the above-described elements 402-420 may be varied in size, shape, display, function, structure, configuration, quantity, topology, or other attributes and are not limited to the examples shown and described, which are provided for explanatory purposes.

Figure 5:
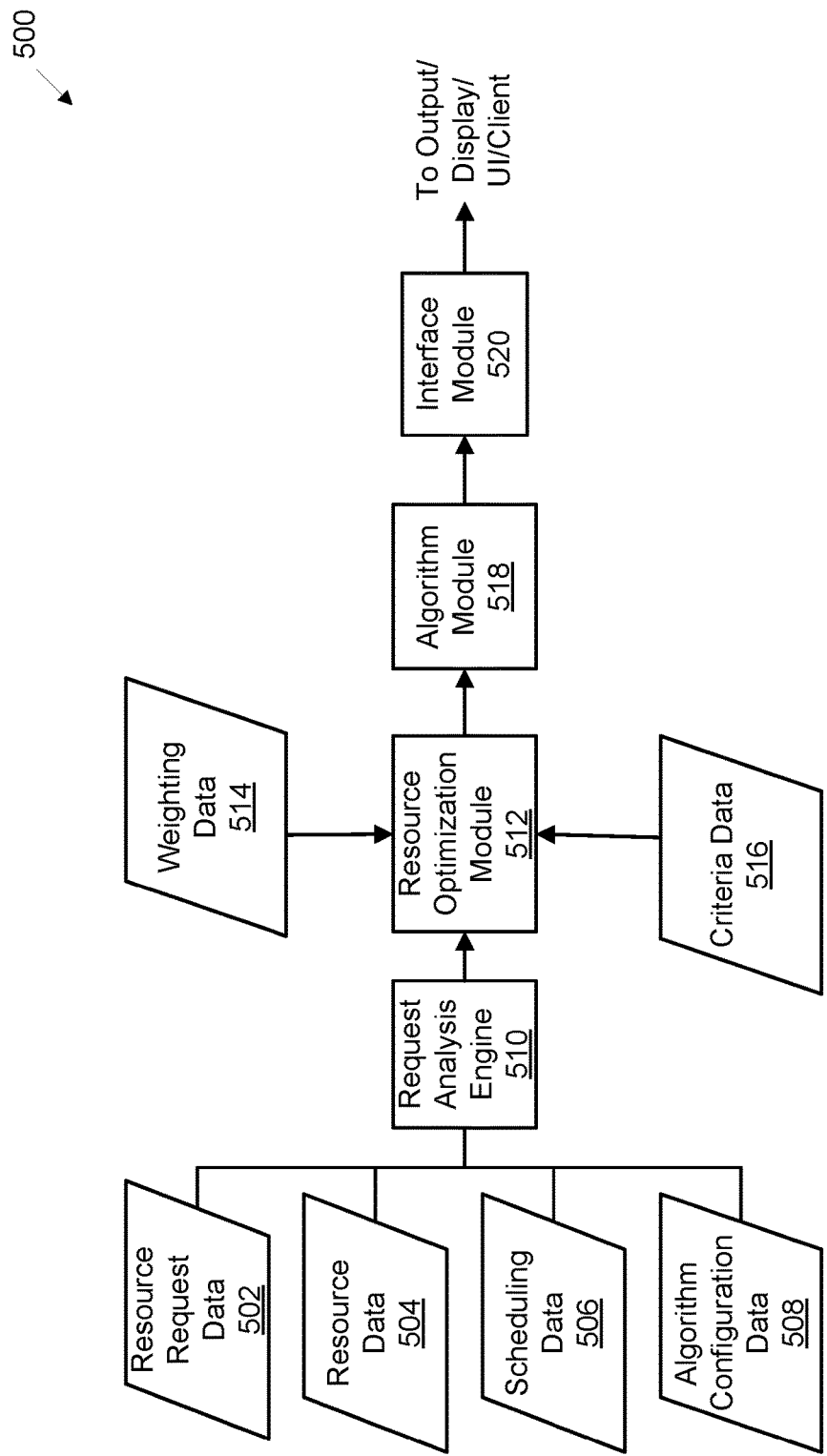
FIG. 5 illustrates an exemplary data flow for algorithmically optimized determination of resource assignments in machine request analyses.

FIG. 5 illustrates an exemplary data flow for algorithmically optimized determination of resource assignments in machine request analyses. Here, data flow 500 includes resource request data 502, resource data 504, scheduling data 506, algorithm configuration data 508, request analysis engine 510, resource optimization module 512, weighting data 514, criteria data 516, algorithm module 518, and interface module 520. As shown and described, like-named and like-numbered elements may be implemented and configured similarly to each other, without limitation or restriction. For example, request analysis engine 510 may be implemented may be designed, implemented, and/or configured similarly in function and structure to request analysis engine 106 (FIG. 1), without limitation or restriction. As another example, resource optimization module 512 may be designed, implemented, and/or configured similarly in function and structure to criteria module 214 (FIG. 2A), without limitation or restriction. As a further example, algorithm module 518 may be designed, implemented, and/or configured similarly in function and structure to algorithm module 108 (FIG. 1), without restriction or limitation. As another example, interface module 520 may be designed, implemented, and/or configured similarly in function and structure to interface module 104 (FIG. 1), without limitation or restriction.

In some examples, resource request 124 (FIG. 1) may be composed of different types or categories of data. For example, resource request 124 may include resource request data 502 (i.e., data that identifies a given data packet, segment, frame, or other encapsulation as being associated with a resource request (e.g., resource request 124 (FIG. 1)), resource data 504 (i.e., data that is included in a resource request that is used to describe or identify a general category of resources (e.g., human resources, project staffing, financial planning and analysis, professional services, services, and others, without limitation or restriction)), scheduling data 506 (i.e., data that describes a given time, time period, time range, time duration, or any other temporal criteria associated with a given resource request), and algorithm configuration data 508 (i.e., data that is configured to identify, select, call, use, or otherwise invoke one or more algorithms to process a given request against various repositories (e.g., repositories 114-116, 130 (FIG. 1), repositories 204-206 (FIG. 2A), and others) storing data associated with resources). In some examples, types of algorithms may be identified within algorithm configuration data and used to call, for example, a simulated annealing algorithm to determine resources that can be matched to a given resource request. In other examples, algorithm configuration data 508 may include data that identifies machine learning or deep learning algorithms and sources of data against which "teaching" or "training" can occur in order to generate suitable results, as described above. In still other examples, algorithm configuration data 508 may also include criteria, as described above, that may be used to process a given resource request in order to generate resultant data associated with one or more resource matches.

Regardless of whether one, some, or all are used, data types 502-508, in some examples, are included as data in resource request 124 (FIG. 1), which flows into request analysis engine 510, as described above. Here, request analysis engine 510 processes input data (e.g., resource request 124 (FIG. 1), resource request data 502, resource data 504, scheduling data 506, algorithm configuration data

508, or others, without limitation or restriction) and generates output data that flows as input to resource optimization module 512. As described herein, resource optimization module 512 further processes output data from request analysis engine 510 using additional input data from criteria data 516, which may be stored in criteria data repository 216 (FIG. 2A), and weighting data 514. In some examples, criteria data 516 may be data associated with various criteria that is parsed by request analysis engine 510 and stored in criteria data repository 216 (FIG. 2A). Likewise, weighting data 514 may be used to weight particular criteria, characteristics, or attributes such as those described herein. For example, weighting data 514 may be weighting factors that are input using, for example, interface 300 (FIG. 3) including, but not limited to criteria fields 316 (FIG. 3) and/or criteria input fields 334-340 (FIG. 3). Resource optimization module 512, in some examples, processes input resource request data (e.g., resource request data 502, resource data 504, scheduling data 506, algorithm configuration data 508, or others, without limitation or restriction), weighting data 514, and criteria data 516 to generate output data that is transferred to algorithm module 518, including data or control signals that are configured as instruction to algorithm module 518. Instructions to algorithm module 518, in some examples, may include instructions configured to identify the type, quantity, configuration, executables, libraries, classes, calls (e.g., application or service calls to hosted algorithms or algorithm services such as those described herein) or other criteria, characteristics, or attributes used to implement and run (i.e., execute) one or more algorithms relative to resource request 124 (FIG. 1). Instructions from resource optimization module 512 may also include other data or signals configured to weight various criteria as inputs to, for example, a suitability matrix (used interchangeably hereafter as "matrix") that is used to generate a data model against which called algorithms or algorithm services are applied, as described above in connection with FIGS. 2A-2B.

Referring back to FIG. 5, output data from algorithm module 518 is transferred to interface module 520, which transforms data identifying resources that are matched with the criteria, characteristics, attributes, or other requirements of a resource request (e.g., resource request 124 (FIG. 1)). Interface module 520 may be configured to generate output data that is sent to client 128 (FIG. 1) to be rendered and displayed on UI/interface 126. In other examples, the above-described elements may be varied in function, structure, configuration, quantity, topology, or other attributes and are not limited to the examples shown and described, which are provided for explanatory purposes.

Figure 6:
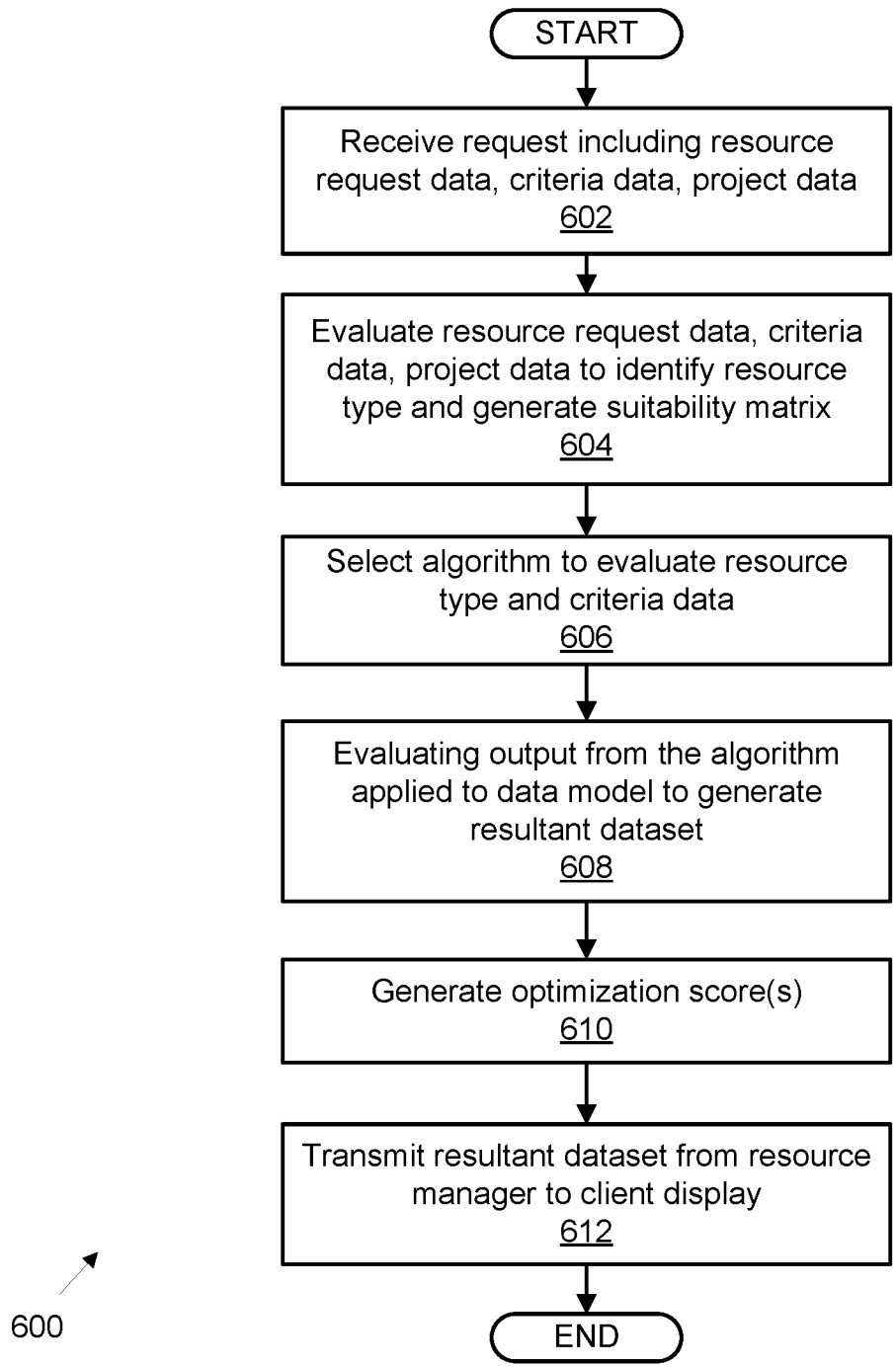
FIG. 6 illustrates an exemplary process for algorithmically optimized determination of resource assignments in machine request analyses.

FIG. 6 illustrates an exemplary process for algorithmically optimized determination of resource assignments in machine request analyses. Here, process 600 begins by receiving a request including resource request data, criteria data, and project data, among other types, categories, or sub-categories of data (602). As used herein, project data may include any type or amount of data that is associated with a given resource request including, but not limited to, project type, project duration, project location, project staffing requirements, project cost estimates, project material demands, and others, without limitation or restriction. Upon receipt, the resource request data, criteria data, and project data, are evaluated (e.g., parsed, processed) to identify any associated resource types (e.g., personnel, equipment, material, funding, locations, and the like, without limitation or restriction) and to generate a suitability matrix, as described above in connection with FIG. 2B (604). Next, an algorithm or multiple algorithms are selected to evaluate the resource type and criteria data (606). After the selected algorithm(s) are run against a data model generated by modeling engine 236 (FIG. 2B), the output of the application of the algorithm (s) is evaluated in order to generate a resultant dataset associated with resources matched to a given resource request (e.g., resource request 124 (FIG. 1)) (608). An optimization score is then generated and associated with each resource identified by applying one or more algorithms to a generated data model (610). In some examples, an optimization score or cost (as used hereafter "optimization score" and "optimization cost" may be used interchangeably without distinction, restriction, or limitation) may be any type of qualitative or quantitative (i.e., numerical) cost that is assigned to each resource identified responsive to a given resource request. The resultant dataset is then processed and transmitted to an interface (e.g., UI/interface 126 (FIG. 1)) to be rendered and displayed on a client (e.g., client 128 (FIG. 1)) (612). In other examples, the above-described process may be varied in order, steps, processes, sub-processes, design, configuration, or other aspects and are not limited to the examples shown and described, which are provided for explanatory purposes.

Figure 7:
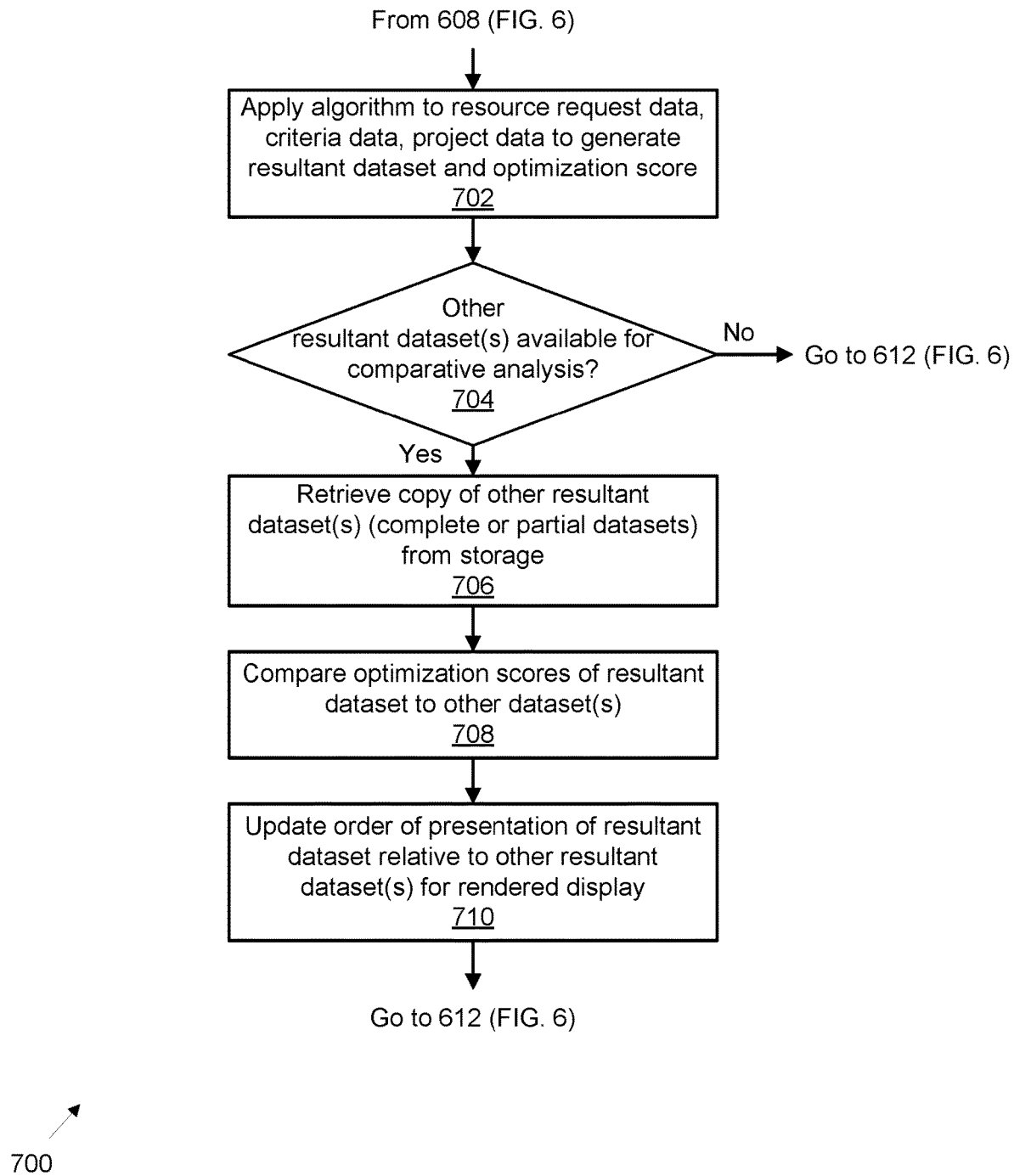
FIG. 7 illustrates another exemplary process for algorithmically optimized determination of resource assignments in machine request analyses.

FIG. 7 illustrates a further exemplary process for algorithmically optimized determination of resource assignments in machine request analyses. Here, process 700 is shown, providing additional detail regarding an exemplary implementation of resource optimization (i.e., generating optimization score(s) (i.e., optimization costs) (610; FIG. 6)). As shown, process 700 begins by receiving output data from applying selected algorithm(s) in accordance with a data model generated by modeling engine 236 (FIG. 2B), as shown and described at 608 (FIG. 6), in order to identify a list of resources that may be suitably matched, as described above, to a given resource request (e.g., resource request 124 (FIG. 1)) (702). Next, a determination is made as to whether there are other resultant datasets associated with other resources that have been matched to a given resource request and are available for comparative analysis in order to generate, for example, optimization scores (i.e., optimization cost) for each resource (704). In some examples, an optimization score or cost may be a qualitative (e.g., yes no, maybe, or the others) or quantitative (e.g., numerical) indicator that identifies a level or degree to which a given resource matches a resource request (e.g., resource request 124 (FIG. 1)).

Here, if a determination is made that no other resources have been identified (i.e., there are no resultant datasets for other resources that have been identified by resource optimization module 112 (FIGS. 1, 2A) or 512 (FIG. 5)), then process 700 returns to transmit resultant datasets from resource manager 110 (FIG. 1) to UI/interface 126 on client 128 (612; FIG. 6). Alternatively, if other resources have been identified as being suitably matched to a given resource request (i.e., resultant datasets associated with resources identified as being matched with a given resource request), then copies of the resultant dataset(s) associated with other resource(s) that have been matched to resource request 124 (FIG. 1), as an example, are retrieved from repositories 114-116, 130 (FIG. 1) or others (706).

In some examples, retrieved copies of resultant datasets may be compared based on optimization scores or costs (or other attributes) (708). Based on the comparisons, ordering, ranking, stacked ranking, listing, or other structured or unstructured displays of resources based on optimization scores is updated. Data associated with the ordered, ranked, stacked ranked, or otherwise organized sets of resources to be identified as responsive to resource request 124 (FIG. 1) may be generated, formatted, and encapsulated for transmission to client 128 (FIG. 1) to be rendered and displayed on UI/interface 126 (FIG. 1) (710). In other examples, the above-described process for resource optimization may be varied in order, steps, processes, sub-processes, design, configuration, or other aspects and are not limited to the examples shown and described, which are provided for explanatory purposes.

Figure 8:
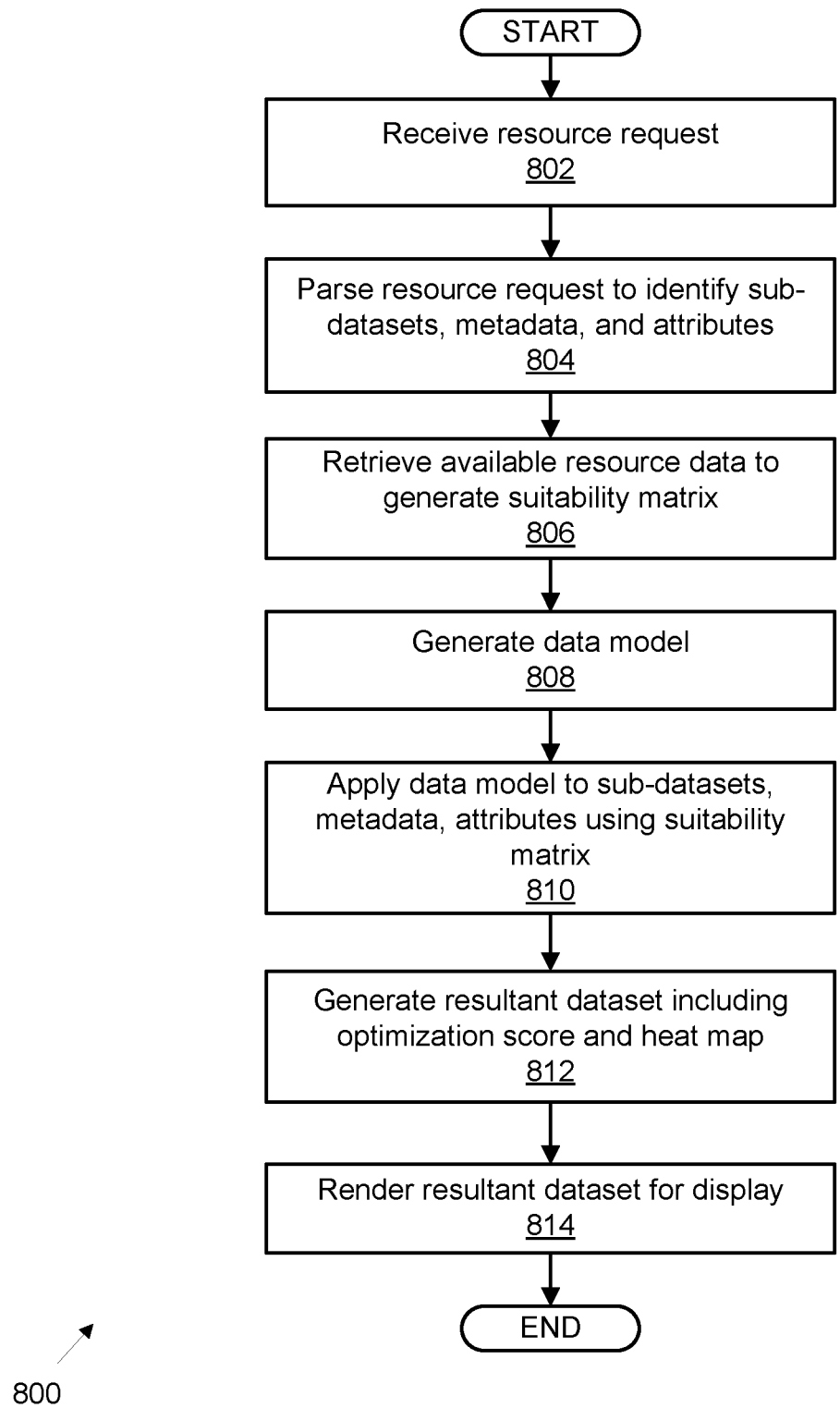
FIG. 8 illustrates a further exemplary process for algorithmically optimized determination of resource assignments in machine request analyses.

FIG. 8 illustrates an alternative exemplary process for algorithmically optimized determination of resource assignments in machine request analyses. Here, process 800 begins when a resource request (e.g., resource request 124 (FIG. 1)) is received (802). Next, as an example, a received resource request is parsed to identify data, datasets, sub-datasets, attributes, criteria, weighting factors, metadata, and other characteristics that are used by platform 102 to match resources to the given request (804). In some examples, data extracted, retrieved, copied, or otherwise parsed and processed from a given resource request is used to generate a suitability matrix, as described above (806).

A data model may be generated by modeling engine 236 (FIG. 2B) and configured to be used by applying one or more algorithms to data extracted, retrieved, copied, or otherwise parsed and processed from a given resource request (808). Once configured, one or more algorithms or algorithm services, as described in greater detail above, may be applied to data extracted, retrieved, copied, or otherwise parsed and processed from a given resource request according to a data model and using a suitability matrix (810). In some examples, a suitability matrix may be structured to present data associated with resources in a data structure that is configured to present data points associated with attributes, characteristics, or criteria in a consistent structure that permits rapid algorithmic analysis. Examples of data structures that may be used to generate a suitability matrix may include tables, columns, rows, graphs, and others, without limitation or restriction.

Here, after applying algorithm(s) and/or algorithmic service(s) to resource data (e.g., data stored in one or more of repositories 114-116 (FIG. 1)), a resultant dataset is generated including data associated with each resource identified as a potential match to a given resource request (812). In some examples, a resultant dataset may be configured to include, in addition to data associated with each resource identified as a match to a given resource request, comparative analyses, optimization scores (i.e., optimization costs), rankings (e.g., ordered rankings, stacked rankings, and others, without limitation or restriction), maps or graphs of resources plotted against axes defined by criteria provided in a given resource request (e.g., resource request 124 (FIG. 1)), or other types of data products generated from analyzing resource data, without limitation or restriction (812). For example, a resultant dataset may include a "heat" map that is generated to plot graphically or visually how various resources are matched to the criteria of a given resource request. In some examples, "heat" may be plotted using color scales or gradations that indicate when a given resource is more closely or "suitably" (as described above) matched. As an example, using a closest distance graphical analysis, a distance measured along an edge of a graph in which a resource and criteria from a resource request are plotted and the shorter (i.e., closer) the distance of a given resource, the "hotter" an associated data point is plotted on the heat map. In some examples, heat may be expressed using distance, color, or other graphical attributes that may depict resources that are a closer match to a given resource request. Further, using techniques such as heat maps, tables, graphs, or others, such as those described herein, may be generated and rendered for display (814). In other examples, the above-described process may be varied in order, steps, processes, sub-processes, design, configuration, or other aspects and are not limited to the examples shown and described, which are provided for explanatory purposes.

Figure 9:
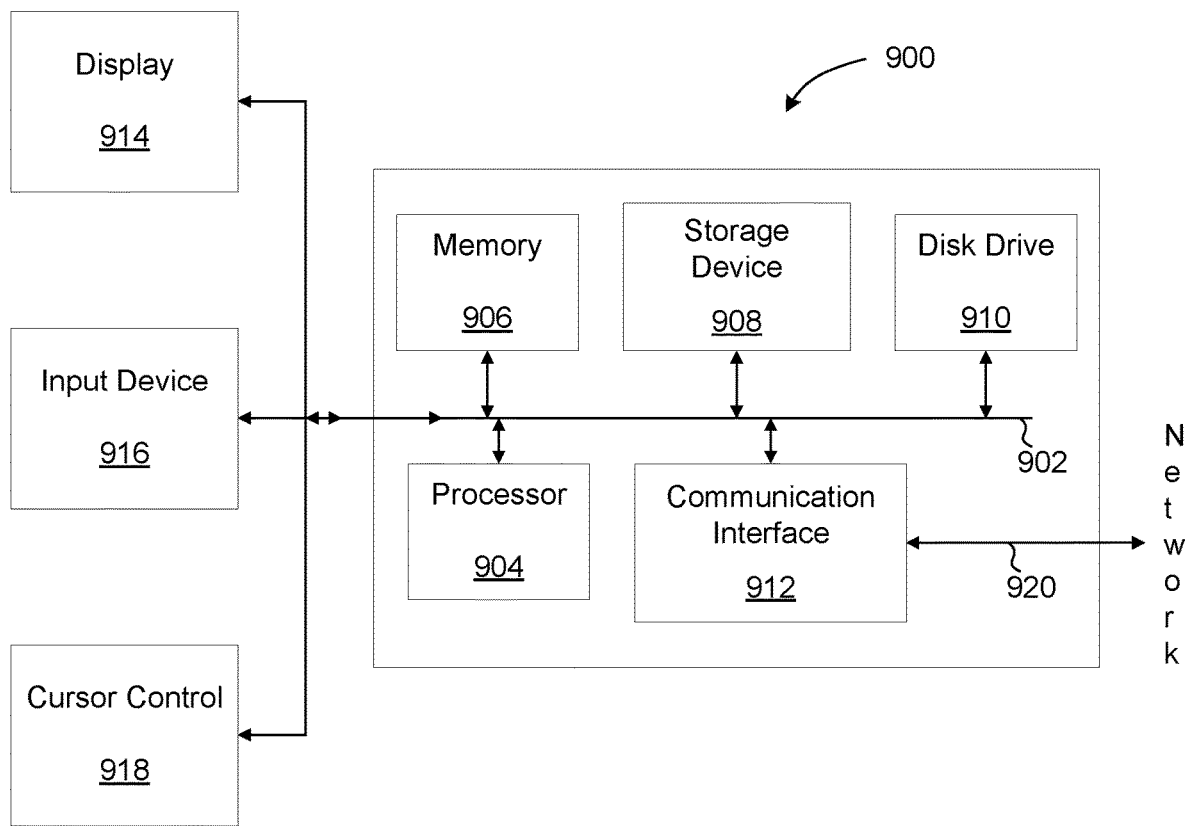
FIG. 9 illustrates an exemplary computing system suitable for algorithmically optimized determination of resource assignments in machine request analyses.

FIG. 9 illustrates an exemplary computing system suitable for algorithmically optimized determination of resource assignments in machine request analyses. Here, computing system 900 may be used to implement computer programs, applications, methods, processes, or other software to perform the above-described techniques. Computing system 900 includes a bus 902 or other communication mechanism for communicating information, which interconnects subsystems and devices, such as processor 904, system memory 906 (e.g., RAM), storage device 908 (e.g., ROM), disk drive 910 (e.g., magnetic or optical), communication interface 912 (e.g., modem or Ethernet card), display 914 (e.g., CRT or LCD), input device 916 (e.g., keyboard), cursor control 918 (e.g., mouse or trackball), communication link 920, and network 922.

According to some examples, computing system 900 performs specific operations by processor 904 executing one or more sequences of one or more instructions stored in system memory 906. Such instructions may be read into system memory 906 from another computer readable medium, such as static storage device 908 or disk drive 910. In some examples, hard-wired circuitry may be used in place of or in combination with software instructions for implementation.

The term "computer readable medium" refers to any tangible medium that participates in providing instructions to processor 904 for execution. Such a medium may take many forms, including but not limited to, non-volatile media and volatile media. Non-volatile media includes, for example, optical or magnetic disks, such as disk drive 910. Volatile media includes dynamic memory, such as system memory 906.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 902 for transmitting a computer data signal.

In some examples, execution of the sequences of instructions may be performed by a single computing system 900. According to some examples, two or more computing system 900 coupled by communication link 920 (e.g., LAN, PSTN, or wireless network) may perform the sequence of instructions in coordination with one another. Computing system 900 may transmit and receive messages, data, and instructions, including program, i.e., application code, through communication link 920 and communication interface 912. Received program code may be executed by processor 904 as it is received, and/or stored in disk drive 910, or other non-volatile storage for later execution. In other examples, the above-described techniques may be implemented differently in design, function, and/or structure and are not intended to be limited to the examples described and/or shown in the drawings.

Although the foregoing examples have been described in some detail for purposes of clarity of understanding, the above-described techniques are not limited to the details provided. There are many alternative ways of implementing the above-described invention techniques. The disclosed examples are illustrative and not restrictive.

What is claimed:

1. A method, comprising:
receiving at a computing platform a request comprising resource request data and criteria data;
evaluating the resource request data and the criteria data to identify a resource type and to generate a suitability matrix, the evaluating comprising invoking an analytical module configured to generate a data model using the resource request data, the criteria data, the resource type, and the suitability matrix;
selecting an algorithm to apply to the data model using the suitability matrix, the resource request data, the criteria data, and the resource type;
evaluating an output from the algorithm being applied to the data model to generate a resultant dataset, including evaluating another resultant dataset generated by applying another algorithm to another data model generated using the resource request data, the criteria data, the resource type, and the suitability matrix;
generating an optimization cost associated with the resultant dataset, the resultant dataset including the optimization cost;
using a simulated annealing algorithm to randomly generate further data indicating a selection of one or more resources using the resource request data and the criteria data, the selection being assigned the optimization cost; and
transmitting from a resource manager module in data communication with the computing platform to a client the resultant dataset identifying a resource, the resultant dataset being configured to at least be rendered on a display.

2. The method of claim 1, wherein the criteria data indicates a role.

3. The method of claim 1, wherein the criteria data indicates a region.

4. The method of claim 1, wherein the criteria data indicates a practice.

5. The method of claim 1, wherein the criteria data indicates a group associated with a resource.

6. The method of claim 1, wherein the resultant dataset is configured to assign the resource to the resource request data in a stacked rank order.

7. The method of claim 1, wherein the criteria data indicates a selection criteria associated with a resource, the resource being matched, using a weighting, to a resource request associated with the resource request data.

8. The method of claim 1, wherein the selecting the algorithm comprises generating an application call to an application service configured to invoke the simulated annealing algorithm.

9. The method of claim 1, wherein the selecting the algorithm comprises the simulated annealing algorithm.

10. The method of claim 1, wherein selecting the resultant dataset comprises a list of the one or more resources associated with the output and an another output, the output and the another output each being indicated as a solution to the request.

11. The method of claim 1, wherein the selecting the algorithm comprises invoking the simulated annealing algorithm selected based on one or more criteria indicated by the criteria data.

12. The method of claim 1, wherein the selecting the algorithm comprises generating a call to an algorithm service configured to invoke the simulated annealing algorithm when the algorithm service is called by the computing platform.

13. The method of claim 1, wherein the criteria data is numerically weighted before the selecting the algorithm and transformatively applied to the resource request data using the criteria data.

14. The method of claim 1, wherein the algorithm is invoked by the computing platform, the algorithm being applied to the resource request data and the criteria data to generate the optimization cost and the resultant dataset, the resultant dataset being configured to identify the one or more resources assignable to the resource request data, and the criteria data.

15. A system, comprising:
a memory device configured to store resource request data, criteria data, and project data; and
a processor configured to receive at a computing platform a request comprising the resource request data and the criteria data, to evaluate the resource request data and the criteria data to identify a resource type and to generate a suitability matrix, the evaluating comprising invoking an analytical module configured to generate a data model using the resource request data, the criteria data, the resource type, and the suitability matrix, to select an algorithm to apply to the data model using the suitability matrix, the resource request data, the criteria data, and the resource type, to evaluate an output from the algorithm being applied to the data model to generate a resultant dataset, including evaluating another resultant dataset generated by applying another algorithm to another data model generated using the resource request data, the criteria data, the resource type, and the suitability matrix, to generate an optimization cost associated with the resultant dataset, the resultant dataset including the optimization cost, to use a simulated annealing algorithm to randomly generate further data indicating a selection of one or more resources using the resource request data and the criteria data, the selection being assigned the optimization cost, and to transmit from a resource manager module in data communication with the computing platform to a client the resultant dataset identifying a resource, the resultant dataset being configured to at least be rendered on a display.

16. The system of claim 15, wherein the algorithm comprises an algorithm service invoked by the computing platform over a data network coupling the client and the computing platform.

17. The system of claim 15, wherein the algorithm uses simulated annealing to determine randomly a solution including the one or more resources to be assigned to the request.

18. The system of claim 15, wherein the resultant dataset is configured to be displayed with a heat map and a list of the one or more resources.

19. A non-transitory computer readable medium having one or more computer program instructions configured to perform a method, the method comprising:

receiving at a computing platform a request comprising resource request data and criteria data;

evaluating the resource request data and the criteria data to identify a resource type and to generate a suitability matrix, the evaluating comprising invoking an analytical module configured to generate a data model using the resource request data, the criteria data, the resource type, and the suitability matrix;

selecting an algorithm to apply to the data model using the suitability matrix, the resource request data, the criteria data, and the resource type;

evaluating an output from the algorithm being applied to the data model to generate a resultant dataset, including evaluating another resultant dataset generated by applying another algorithm to another data model generated using the resource request data, the criteria data, the resource type, and the suitability matrix;

generating an optimization cost associated with the resultant dataset, the resultant dataset including the optimization cost;

using a simulated annealing algorithm to randomly generate further data indicating a selection of one or more resources using the resource request data and the criteria data, the selection being assigned the optimization cost; and transmitting from a resource manager module in data communication with the computing platform to a client the resultant dataset identifying a resource, the resultant dataset being configured to at least be rendered on a display.

\* \* \* \* \*